United States Patent
Yamasaki et al.

(10) Patent No.: US 8,874,829 B2
(45) Date of Patent: Oct. 28, 2014

(54) STORAGE SYSTEM AND STORAGE SYSTEM CONTROL METHOD

(75) Inventors: Yuta Yamasaki, Minamiashigara (JP); Takeki Okamoto, Odawara (JP); Mikio Fukuoka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 276 days.

(21) Appl. No.: 13/502,638

(22) PCT Filed: Mar. 30, 2012

(86) PCT No.: PCT/JP2012/002242
§ 371 (c)(1),
(2), (4) Date: Apr. 18, 2012

(87) PCT Pub. No.: WO2013/145029
PCT Pub. Date: Oct. 3, 2013

(65) Prior Publication Data
US 2013/0262750 A1 Oct. 3, 2013

(51) Int. Cl.
G06F 12/00 (2006.01)
G06F 13/00 (2006.01)
G06F 13/28 (2006.01)
G06F 12/02 (2006.01)

(52) U.S. Cl.
CPC ........ *G06F 12/0246* (2013.01); *G06F 12/0253* (2013.01)
USPC ............................. 711/103; 711/114; 711/156

(58) Field of Classification Search
CPC ............ G06F 12/0246; G06F 12/0253; G06F 2212/262; G06F 2212/7205
USPC ......................................... 711/103, 114, 156
See application file for complete search history.

(56) References Cited

U.S. PATENT DOCUMENTS

| | | | |
|---|---|---|---|
| 2008/0034174 A1* | 2/2008 | Traister et al. | 711/159 |
| 2010/0100664 A1* | 4/2010 | Shimozono | 711/103 |
| 2010/0325351 A1* | 12/2010 | Bennett | 711/103 |
| 2012/0036309 A1* | 2/2012 | Dillow et al. | 711/103 |
| 2012/0066447 A1* | 3/2012 | Colgrove et al. | 711/114 |
| 2013/0246686 A1* | 9/2013 | Noborikawa et al. | 711/102 |

FOREIGN PATENT DOCUMENTS

JP 2010-102369 A 5/2010
WO WO 2009/003038 A2 12/2008

OTHER PUBLICATIONS

PCT International Search Report and Written Opinion on application PCT/JP2012/002242 mailed Oct. 8, 2012; 12 pages.

* cited by examiner

*Primary Examiner* — Ryan Bertram
(74) *Attorney, Agent, or Firm* — Foley & Lardner LLP

(57) ABSTRACT

The device controller (a) executes a data I/O process with respect to a physical storage area in accordance with an I/O command, and (b) sends to the storage controller an I/O command-related response comprising status information subsequent to being changed in accordance with the I/O process. The storage controller (A) receives the response from the target physical storage device, and (B) based on the status information included in the response received in (A), makes a determination as to whether or not to execute internal processing, and in a case where the result of the determination is to execute internal processing, sends to the target physical storage device an internal processing execution command instructing the execution of internal processing. The device controller in the target physical storage device (c), upon receiving the internal processing execution command, executes internal processing in accordance with the internal processing execution command.

10 Claims, 19 Drawing Sheets

Fig.7

| RG | LBA | LUN | FMD |
|---|---|---|---|
| 1-1 | xxxxx ~ yyyyy | 01 | ABCD |
| | yyyyy ~ bbbbb | 02 | |
| | ....... | ....... | |
| | ....... | ....... | |
| ... | ....... | ....... | ....... |
| | ....... | ....... | |

701 / 702 / 703 / 61 / 704

Address management table

Fig.8

| RG ID | Status |
|---|---|
| 01 | Normal |
| ... | Maintenance in progress |

801 / 802 / 63

Status management table

Fig.9

| FMD ID | Flag |
|--------|------|
| 01/01 | Normal |
| 01/02 | Reclamation in progress |

901 · 902 · 65

Internal processing flag table

Fig.10

| FMD ID | Tag information |
|--------|-----------------|
| 01/01 | 3 |
| 01/02 | 5 |

1001 · 1002 · 67

Tag information management table

Fig.12

| Logical page 1201 | Physical page 1202 |
|---|---|
| 0 | Unallocated |
| 1 | Unallocated |
| 2 | Unallocated |
| : | : |
| 5 | 6350 |
| : | : |
| 8 | 12702 |
| : | : |

111

Logical page/physical page translation table

Fig.13

| Block ID 1301 | Number of rewrites 1302 | Number of valid pages 1303 |
|---|---|---|
| 0 | 100 | 0 |
| 1 | 0 | 100 |
| 2 | 900 | 128 |
| : | : | : |

112

Block management table

Fig.14

| Block ID (1401) | First page (1402) | 113 |
|---|---|
| 100 | 10 |
| 200 | 8 |
| 0 | 120 |
| : | : |

Write-in-progress block management table

STORAGE SYSTEM AND STORAGE SYSTEM CONTROL METHOD

TECHNICAL FIELD

The present invention relates to a storage system comprising multiple physical storage devices, which forms a RAID group, and a control method for this storage system.

BACKGROUND ART

There are storage systems, which comprise multiple physical storage devices (hereinafter, PDEV) comprising a RAID (Redundant Arrays of Inexpensive Disks) group.

In addition to either one or multiple RAID groups, this type of storage system generally comprises a controller (hereinafter called "storage controller") for accessing each PDEV comprising the RAID group. The storage controller, for example, receives an I/O (Input/Output) request (for example, either a read request or a write request) from a higher-level apparatus (for example, a host computer or another storage system), and, in accordance with this I/O request, sends an I/O command (for example, a read command or a write command) to a PDEV comprising the RAID group. Hereinafter, a request such as an I/O request received by the storage controller will be called a "request", and a request such as the I/O request received by the PDEV will be called a "command".

The PDEV may be a flash memory drive. For example, a NAND-type flash memory (hereinafter, a NAND-type flash memory will simply be called a flash memory in the explanation here) is mounted in the flash memory drive. The flash memory is a write-once type in which a data overwrite is not possible, and possesses features such as a data read and write being performed in units of pages, and a data erase being performed in units of blocks comprising multiple pages.

The storage system disclosed in Patent Literature 1 is known as a storage system in which the PDEV is a flash memory drive. This storage system performs a correction read in a case where data is to be read from one flash memory drive (hereinafter, the "target drive" in this paragraph) for which destaging (in which data is stored from a cache memory) is possible from among the multiple flash memory drives comprising the RAID group. In a correction read, multiple pieces of data (any one of which may be parity) is read from each of the multiple flash memory drives other than the target drive in the RAID group, and data is restored inside the target drive based on these pieces of data.

CITATION LIST

Patent Literature

PTL 1: Japanese Patent Application Laid-open No. 2010-102369

SUMMARY OF INVENTION

Technical Problem

Generally speaking, the flash memory drive not only performs processing in response to a command (for example, an I/O command) from outside (for example, a storage controller, which is at a higher level than the flash memory drive), but also performs internal processing, which is processing performed without a command from the outside. A reclamation process and a refresh process, for example, are known as internal processing performed by the flash memory drive.

The internal processing, as described above, is processing performed without a command from the storage controller. For this reason, in a case where, based on a read request (or write request) from a higher-level apparatus, the storage controller sends a read command (or a write command) to multiple flash memory drives in the RAID group, the acquisition of read data in accordance with the read request may take time and a response to the read request may be delayed because at least one of the flash memory drives is engaged in internal processing.

Solution to Problem

A storage system comprises a RAID (Redundant Arrays of Inexpensive Disks) group comprised of multiple physical storage devices, and a storage controller, which, in accordance with an I/O request from a higher-level apparatus, sends an I/O command to a target physical storage device, which is the I/O-destination physical storage device within the RAID group. Each physical storage device comprises a physical area, which is regarded as the basis of a logical storage area, and a device controller, which is coupled to the physical storage area and executes internal processing, which is processing executed without receiving a command from outside of the physical storage device. The state of the physical storage area changes in accordance with the input/output of data to/from the physical storage area. The device controller inside the target physical storage device (a) executes data I/O processing with respect to a physical storage area in accordance with an I/O command from the storage controller, and (b) subsequent to executing the I/O processing in (a), sends the storage controller a response with respect to the I/O command, this response comprising status information, which is information denoting information on the state of the physical storage area subsequent to being changed in accordance with the I/O processing. The storage controller (A) receives the response from the target physical storage device, and (B) based on the status information included in the response received in (A), makes a determination as to whether or not to execute internal processing, and in a case where the result of the determination is to execute internal processing, sends the target physical storage device an internal processing execution command instructing the execution of internal processing. The device controller in the target physical storage device (c), upon receiving the internal processing execution command, executes internal processing in accordance with the internal processing execution command.

BRIEF DESCRIPTION OF DRAWINGS

FIG. 7 is a diagram showing an address management table.

FIG. 8 is a diagram showing a status management table.

FIG. 9 is a diagram showing a RC flag table.

FIG. 10 is a diagram showing a tag information management table.

FIG. 12 is a diagram showing a logical page/physical page translation table.

FIG. 13 is a diagram showing a block management table.

FIG. 14 is a diagram showing a write-in-progress block management table.

DESCRIPTION OF EMBODIMENTS

Figure 1A:
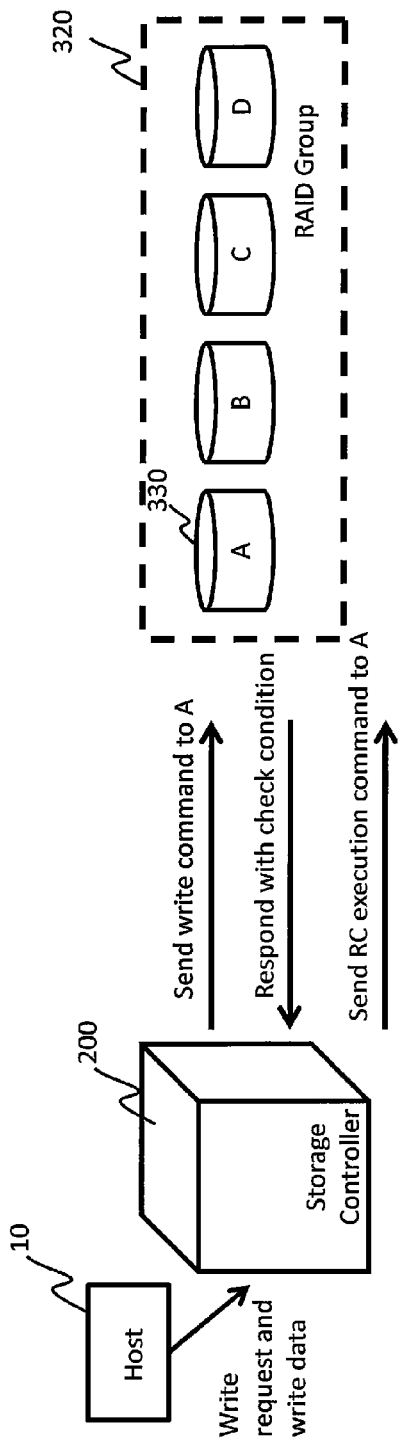
FIG. 1A is a diagram illustrating an overview of an operation in a case where a storage controller related to Example 1 has received a write request from a host.

A number of examples will be explained hereinbelow.

In the following explanation, various information may be explained using the expression "xxx table", but the various information may be expressed using any data structure. That is, to show that the various information is not dependent on the data structure, "xxx table" can be called "xxx information".

Furthermore, in the following explanation, there may be cases where the processing is explained having a controller (either a storage controller or a controller chip) as the doer of the action, but since the stipulated processing is performed in accordance with being executed by a below-explained processor (for example, a CPU (Central Processing Unit)) of these storage controllers while using a storage resource (for example, a memory, which will be explained further below) and/or a communication interface device (for example, a communication port) as needed, the processor may also be the doer of the processing. The controller may comprise a hardware circuit, which performs either all or part of the processing either instead of or in addition to the processor. A computer program may be installed in respective computers from a program source. The program source, for example, may be either a program delivery server or a storage medium.

In the following explanation, a higher-level apparatus of a PDEV is a "storage controller", but in the present invention, an apparatus other than the storage controller (for example, a host computer) may be the higher-level apparatus of the PDEV.

In the following explanation, a LU, which is specified in a I/O request from a host, may be a real LU or may be a virtual LU. A real LU is a LU based on a PDEV in the storage apparatus, which comprises the real LU. A virtual LU may be a LU, which conforms to Thin Provisioning, or may be a LU based on a LU in an external storage apparatus. An I/O-destination logical area, which is identified from an I/O request, may be an area included in a real LU, or may be an area allocated to an area in a virtual LU.

In the following explanation, a flash memory drive (typically, a SSD (Solid State Device)) is used as the PDEV for performing internal processing, but in the present invention, a PDEV other than a flash memory drive may be used.

In the following explanation, in a case where an explanation distinguishes between identical elements, an element identification number may be used instead of an element reference sign. For example, a page with identification information (an identification number) of "1" may be written as "page #1".

In addition, in the following explanation, as was described hereinabove, a case in which the PDEV is a flash memory drive will be given as an example, but in this flash memory drive, the writing and reading of data is performed in page units, and the erasing of data is performed in block units. The block is a storage area comprising multiple pages.

Furthermore, in the following explanation, it is supposed that terms are defined as follows. A "valid page" is a page in which data is stored, and, in addition, which is allocated to a logical area. That is, a "valid page" is a page in which the latest data is stored having the relevant logical area as the write destination. An "invalid page" is a page in which data is stored, but which is not allocated to a logical area. That is, an "invalid page" is a page in which old data is stored having the relevant logical area as the write destination. A "free page" is a page in which data is not stored, and which is not allocated to a logical area. "Valid data" is data stored in a valid page. "Invalid data" is data stored in an invalid page.

Example 1

Next, Example 1 will be explained based on the drawings. Example 1 focuses on the fact that one of the internal processes performed by the flash memory drive is a RC process.

Figure 2:
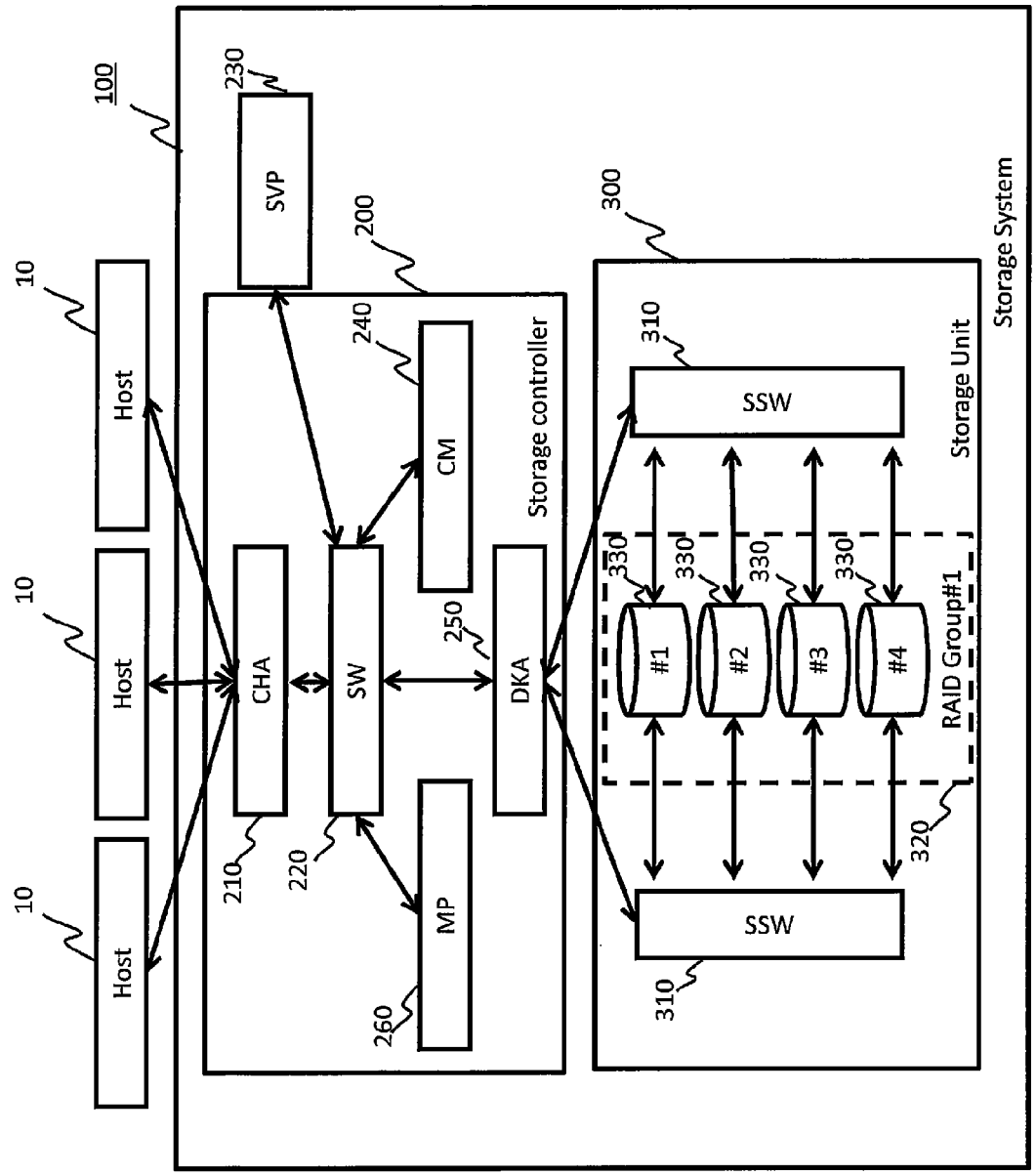
FIG. 2 shows an example of the overall configuration of a computer system comprising the storage system related to Example 1.

A storage system 100 related to this example comprises a storage controller 200 and a storage unit 300 (Refer to FIG. 2). The storage unit 300 comprises either one or multiple RAID groups 320, which comprise multiple flash memory drives (hereinafter referred to as FMD) 330 (Refer to FIG. 2). The operation of the storage system 100 in a case where an I/O request (either a read request or a write request) has been received from a host computer (hereinafter referred to as host) 10, which is an example of a higher-level apparatus, will be explained by referring to the drawings.

FIG. 1A is a diagram illustrating an overview of the processing performed in a case where the storage controller 200 related to Example 1 has received a write request from the host 10.

The flow of processing performed in a case where a write request has been sent from the host 10 is generally as follows:

(S1) The storage controller 200 receives the write request and writes data from the host 10. The write request, for example, comprises a logical unit (LU) number (LUN) and a logical address (LBA) of this LU as information denoting the write destination;

(S2) The storage controller 200, based on the LUN and LBA included in the write request, identifies a RAID group 320 and a FMD 330 (hereinafter, this FMD will be called the target FMD in the explanation of FIG. 1A), which form the basis of the write-destination logical area, and a LBA to be sent to the write-destination FMD 330. The "logical area" here may be an area included in the LU, or may be an area allocated to the LU;

(S3) Next, the storage controller 200 sends a write command, which comprises the identified LBA, and a write subdata to the target FMD 330. The write subdata is data based on the write data from the host 10, specifically, write data, data comprising a part of the write data, or parity;

(S4) The target FMD 330 receives the write command and write subdata, identifies the logical area belonging to the LBA included in the write command, and stores the write subdata in a page (a free page) allocated to the identified logical area; and (S5) The target FMD 330 sends a response with respect to the write command to the storage controller 200.

In the flow of processing described above, in the present example, the target FMD 330, in a case where RC processing is necessary, sends a response (hereinafter, a Check Condition response) comprising information to this effect in the (S5) above. Alternatively, the target FMD 330, in a case where RC processing is not necessary, sends a response (hereinafter, a Good response) comprising information to this effect in the (S5) above.

Here, "a case where RC processing is necessary", for example, is a case where there are equal to or larger than a prescribed number of invalid pages, or less than a prescribed number of free pages with respect to a write-destination block (a block comprising a page allocated to a logical area belonging to the LBA included in the write command).

The storage controller 200, in a case where a Check Condition response (a response to the effect that RC processing is necessary) has been received from the target FMD 330, sends the target FMD 330 a reclamation execution command (hereinafter, may be called the RC execution command) instructing RC processing. The storage controller 200, based on the received Check Condition response, stores status management information, which denotes the RAID group 320 in the storage unit 300 in which a FMD 330 is performing the RC process, and reclamation (RC) execution flag information, which denotes the FMD 300, which is performing the RC process.

The FMD 330 executes RC processing when a RC execution command has been received. The FMD 330, in a case where its own RC processing has ended, sends the storage controller 200 information (hereinafter, a RC end notification) comprising information to this effect. The storage controller 200, upon receiving the RC end notification, updates the status management information and the RC execution flag information.

In accordance with this, the storage controller 200 can immediately discern the state of an FMD 330, which has been changed in accordance with a write process. The storage controller 200 is able to manage the FMD 330 appropriately by instructing the FMD 330 to execute the RC process. In addition, the storage controller 200 can discern the state of each FMD 330 in accordance with the storage controller 200 storing the status management information (the information as to whether or not there is a FMD 330, which is performing the RC process, for each RAID group 320) and the RC execution flag information (information as to whether or not the RC process is being performed for each FMD). In the explanation above, it is supposed that there is one target FMD, but there may be multiple target FMDs.

Figure 1B:
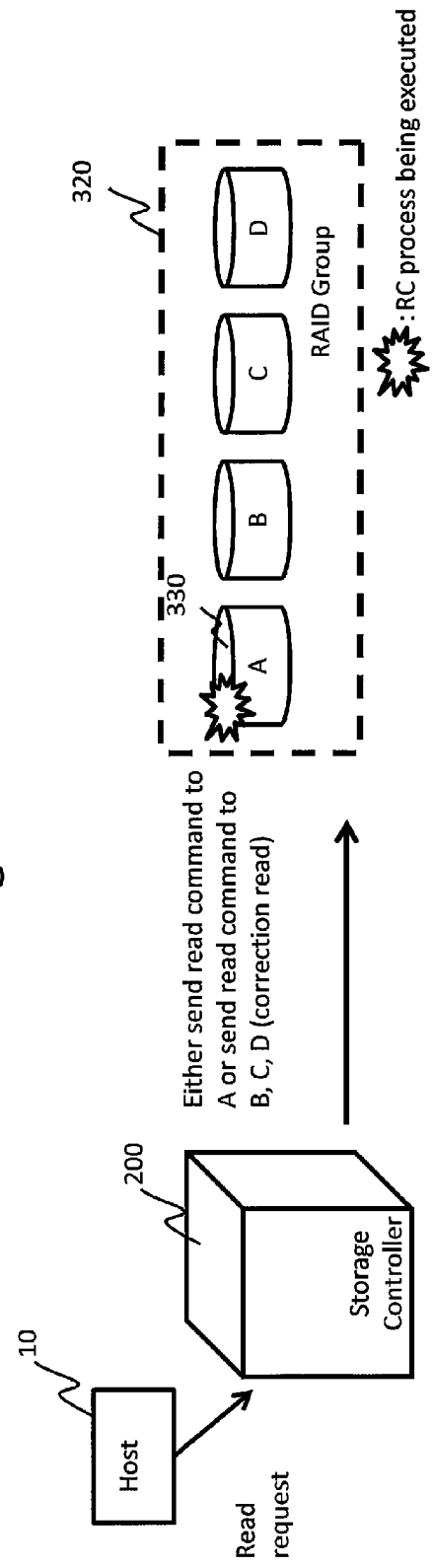
FIG. 1B is a diagram illustrating an overview of an operation in a case where the storage controller related to Example 1 has received a read request from the host.

FIG. 1B is a diagram illustrating an overview of the processing performed in a case where the storage controller 200 related to Example 1 has received a read request from the host 10.

The flow of processing performed in a case where a read request has been sent from the host 10 is generally as follows:

(S1) The storage controller 200 receives the read request from the host 10. The read request, for example, comprises a data storage-destination LUN and a LBA as information denoting a read;

(S2) The storage controller 200, in a case where read data is stored in a cache, sends the host 10 the read data, which is in the cache;

(S3) In a case where the read data is not stored in the cache, the storage controller 200, based on the received LUN and LBA, identifies the RAID group 320, which constitutes the basis of the read-source logical area, and the FMD 330 (hereinafter referred to as the target RAID group and the target FMD 330 in the explanation of FIG. 1B), and an LBA to be sent to the target FMD 330;

(S4) The storage controller 200 sends a read command to the target FMD 330. Then, the storage controller 200 receives data, which constitutes the source of the read data based on the read command (hereinafter, the read subdata) from the target FMD 330, and sends read data based on the received read subdata to the host 10 (hereinafter referred as normal read process). The read subdata, specifically, is read data, data comprising a part of the read data, or parity.

In the flow of processing described above, in this example, the storage controller 200 determines in the above (S4) whether or not there is a FMD 330 executing RC processing in the target RAID group 320 based on the status management information and then RC execution flag information. In a case where the result of the determination is that no FMD 330 in the target RAID group 320 is executing RC processing, the storage controller 200 performs a normal read process.

Alternatively, in a case where the target FMD 330 is executing RC processing, the storage controller 200 performs a correction read process. The correction read process is performed in a case where, of the multiple FMDs 330 comprising the target RAID group 320, there is one FMD (that is, the target FMD) 330, which is executing RC processing. In the correction read process, the storage controller 200 sends a read command to each of either one or multiple FMDs 330 (hereinafter referred to as normal FMD in the explanation of FIG. 1B), which is not performing RC processing in the target RAID group 320. Then, the storage controller 200 receives read subdata (data and/or parity) from one or multiple normal FMDs 330, restores the read data from the received multiple read subdata, and sends this restored read data to the host 10.

As described above, the storage controller 200 can appropriately make a determination as to whether to perform a normal read process or to perform a correction read process in accordance with being able to discern the state of a FMD 330 inside the storage unit 300 by storing the status management information and the internal processing flag information, making it possible to prevent a delayed response when reading data.

FIG. 2 shows an example of the overall configuration of a computer system comprising the storage system 100 related to Example 1.

The computer system comprises the storage system 100 and a host computer (host) 10 as an example of a higher-level apparatus. There may be one or multiple hosts 10. The storage system 100 comprises a storage controller 200 and a storage unit 300. The storage unit 300 comprises multiple relay devices 310 and multiple FMDs 330. The relay device 310 carries out reciprocal communications between the FMDs 330 and a disk adapter (hereinafter referred to as DKA) 250 of the storage controller 200. The relay device 310, for example, is a device comprising multiple SAS (Serial Attached SCSI) expanders. The FMD 330 is mounted with NAND-type flash memory (hereinafter referred to as FM) and cache memory, performs write-once storage with respect to an FM block, and at a prescribed point in time, for example, when the free pages and the invalid pages in a block, which has been written to, each reaches a fixed amount, performs RC processing, which copies the latest data to a new block of the FM, erases the data from the block for which copying has been completed, and restores this block to a block capable of storing data. The storage unit 300 is not limited solely to the FMD 330, and may comprise another storage apparatus.

The storage system 100 comprises multiple RAID groups 320, which comprise two or more FMDs 330 of multiple FMDs 330. In the example shown in the drawing, FMDs #1, #2, #3 and #4 comprise one RAID group #1. For example, data is stored in FMDs #1 through #3, and parity is stored in FMD #4.

In the storage system 100, a logical storage space based on a single RAID group 320 can be provided as either one or multiple logical units (LU). For example, a LUN (Logical Unit Number) is associated with each LU as an identifier.

The storage controller 200 comprises a channel adapter (hereinafter, CHA) 210, a switch (hereinafter, SW) 220, a microprocessor (hereinafter, MP) 260, a DKA 250, and a cache memory (hereinafter CM) 240.

The CHA 210 comprises at least one or more communication interfaces for the storage system 100 to communicate with the host 10. The CHA 210 may be configured as a microcomputer system comprising a CPU and a memory.

The DKA 250 comprises at least one or more communication interfaces for the storage controller 200 to communicate with the FMD 330. The DKA 250 may be configured as a microcomputer system comprising a CPU and a memory the same as the CHA 210.

The CM 240 temporarily stores data received from the host 10 and so forth read from the FMD 330. The CM 240 also stores various types of control information and the like.

The MP 260 executes processing based on an I/O request sent from the host 10, and controls the transfer of data to/from the host 10. For example, the MP 260, upon receiving a write request from the host 10, stores the write data, which is the target of the write request, in the CM 240, and asynchronously with respect to this, destages (writes) the write data from the CM 240 to the FMD 330. The MP 260 performs data access in accordance with the RAID configuration. For this reason, for example, the MP 260 executes a parity computation for the received write data, and writes this data and parity to multiple FMDs 330 based on the RAID group.

In addition, for example, in a case where a read request has been received from the host 10, the MP 260 can perform a normal read and a correction read. Specifically, the MP 260, upon receiving a read request from the host 10, determines whether the read data, which is the source of the read request, is stored in the CM 240, and in a case where the target read data is stored in the CM 240, sends this read data to the host 10. In a case where the target read data is not stored in the CM 240 (in the case of a cache miss), the MP 260 reads read subdata from multiple FMDs 330 comprising the RAID group 320, which is the target of the read request, stores the read subdata-based read data in the CM 240, and sends the stored read data to the host 10 (normal read). In a case where any one of the multiple FMDs 330 comprising the RAID group 320, which is the target of the read request, is executing RC processing, the MP 260 reads the read subdata from each other FMD 330 belonging to the same RAID group 320 as this FMD 330, and stores this read subdata in the CM 240. Then, the MP 260 uses the stored read subdata to restore the read data, and sends this restored read data to the host 10 (correction read).

A service processor (hereinafter SVP) 230, for example, is a type of computer, and is used to either maintain or manage the storage system 100. For example, the SVP 230 configures information in the storage controller 200, and receives and displays information from the storage controller 200.

The SW 220 reciprocally couples the CHA 210, the DKA 250, the CM 240, the MP 260 and the SVP 230. The SW 220, for example, may be a cross-bus switch or the like.

Figure 3:
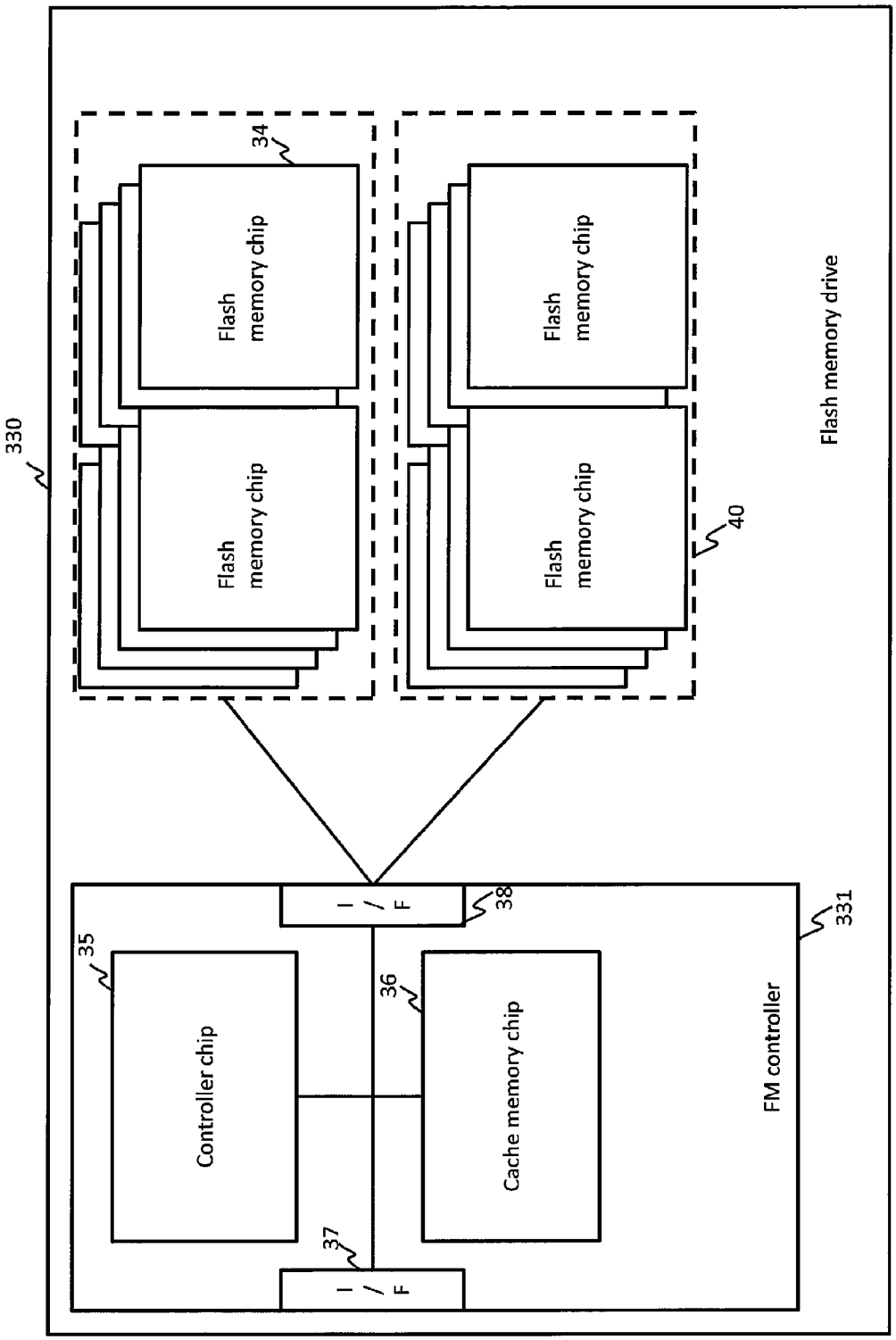
FIG. 3 is a diagram showing the configuration of an FMD.

FIG. 3 is a diagram showing the configuration of the FMD 330.

The FMD 330 comprises a flash memory controller (hereinafter referred to as FM controller) 331 and multiple flash memory chips 34.

The FM controller 331 comprises a controller chip 35, a cache memory chip 36, an interface (I/F) 37 coupled to the DKA 250 of the storage controller 200, and an interface (I/F) 38 for communicating with the multiple flash memory chips 34.

The cache memory chip 36 is a volatile memory comprising mainly RAM (Random Access Memory). Various programs (not shown in the drawing) for controlling the flash memory drive 330 are stored in the cache memory chip 36. The cache memory chip 36 temporarily stores either a read or a write (hereinafter, may be described as read/write) command and write subdata from the storage controller 200. The cache memory chip 36 also temporarily stores read subdata read from the flash memory chip 34.

The controller chip 35 performs the following processing in accordance with executing various programs stored in the cache memory chip 36. For example, the controller chip 35 interprets a read/write command, and performs access control between the storage controller 200, the cache memory chip 36, and/or the flash memory chip 34. Specifically, for example, the controller chip 35, based on a read command, reads read subdata stored in the flash memory chip 34 to an area of the cache memory chip 36, and thereafter, sends this read subdata to the host 10. The controller chip 35 also writes a write command and writes subdata to an area of the cache memory chip 36, and thereafter, sends write data-based write subdata to the flash memory chip 34 as write data. Furthermore, when accessing the flash memory chip 34 based on a read/write command, the controller chip 35 translates the data storage location in the read/write command specified using a logical address (LBA) into a physical address denoting the physical storage area in the FM 332. The controller chip 35 may comprise a CPU.

The FMD 330 comprises a flash memory module 40 comprising multiple flash memory chips 34. The multiple flash memory chips are respectively coupled to the I/F 30 of the FM controller 331.

Figure 4:
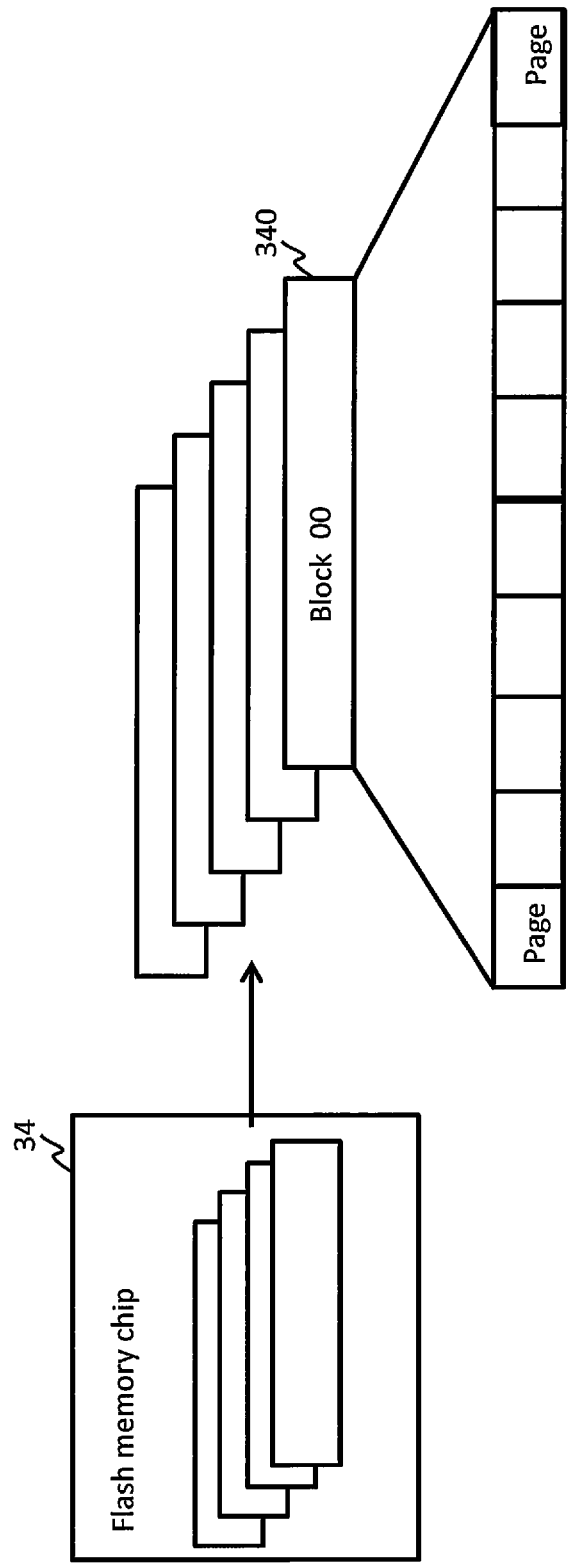
FIG. 4 is a diagram showing the configuration of a flash memory chip.

FIG. 4 is a diagram showing the configuration of the flash memory chip 34. In the following explanation, the single flash memory chip (hereinafter referred to as FM chip) of the drawing number will be explained, but the configuration is the same for the other FM chips as well.

A nonvolatile memory area inside the FM chip 34 comprises multiple (for example, 4096) blocks 340. Stored data is erased in block units. Each block 340 comprises multiple (for example, 64) pages 341. Data is sequentially stored in the pages in the block.

Figure 5:
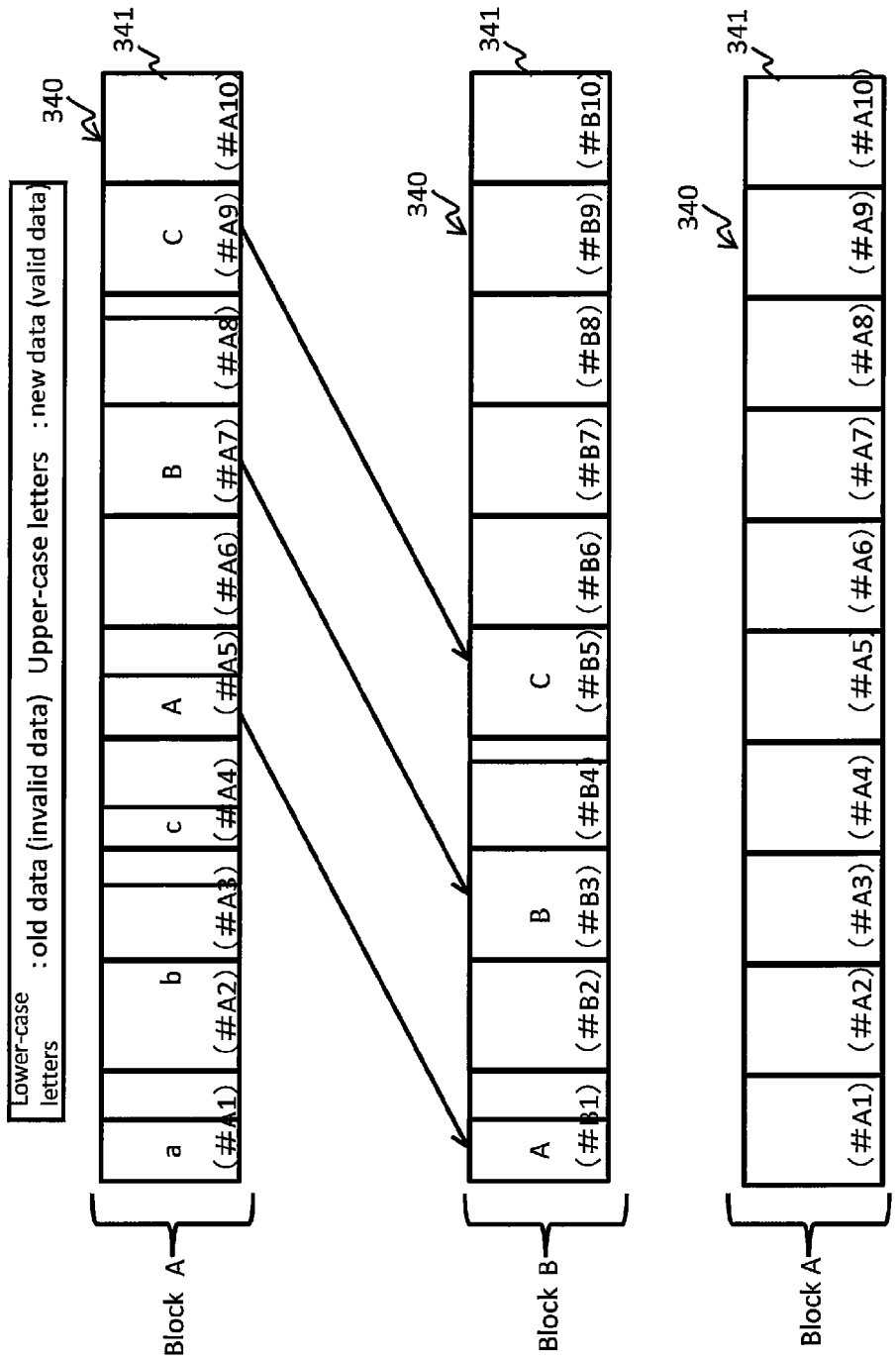
FIG. 5 is a diagram showing the configuration of a block.

FIG. 5 is a diagram showing the configuration of the block.

Data (write subdata) is stored sequentially in free pages inside the block 340. The data is stored from the first page. When the quantity of data is not an integral multiple of the page capacity (for example, when the quantity of data is smaller than the page capacity), a free area will remain in the page, and successive data is stored in the page corresponding to the logical address subsequent to the logical address of this page. When the quantity of data is larger than the page capacity, the data is stored in sequence in the page(s) corresponding to consecutive logical addresses. In a case where there are few free blocks in a FM chip 34, the RC process is performed. As used here, a free block is a block in which all the pages in the block are free pages.

Specifically, for example, it is supposed that data a, b and c are stored in block A. Pages #A1 through #A4, in which the data a, b and c are stored at this time, are valid pages. Data a is stored in page #A1, but because the data a is smaller than the capacity of page #A1, a free area remains in page #A1. Data b is stored in pages #A2 and #A3. Data c is stored in page #A4. Since a data overwrite is not possible, in a case where the data a, b and c are updated, the post-update data A, B and C are stored in order from the first free page #A5 through page #A9. Pages #A5 through #A9 become valid pages in accordance with the storage of the update data. Pages #A1 through #A4 in which the pre-update data is stored become invalid pages.

The RC process is performed when the free blocks in the FM chip 34 diminish. In this RC process, for example, the FM controller copies the data from the valid pages #A5 through #A9 to pages #B1 through #B4 of the other block B, and thereafter, erases the data from block A. In accordance with this, block A becomes a free block (all of the pages of block A become free pages).

Figure 6:
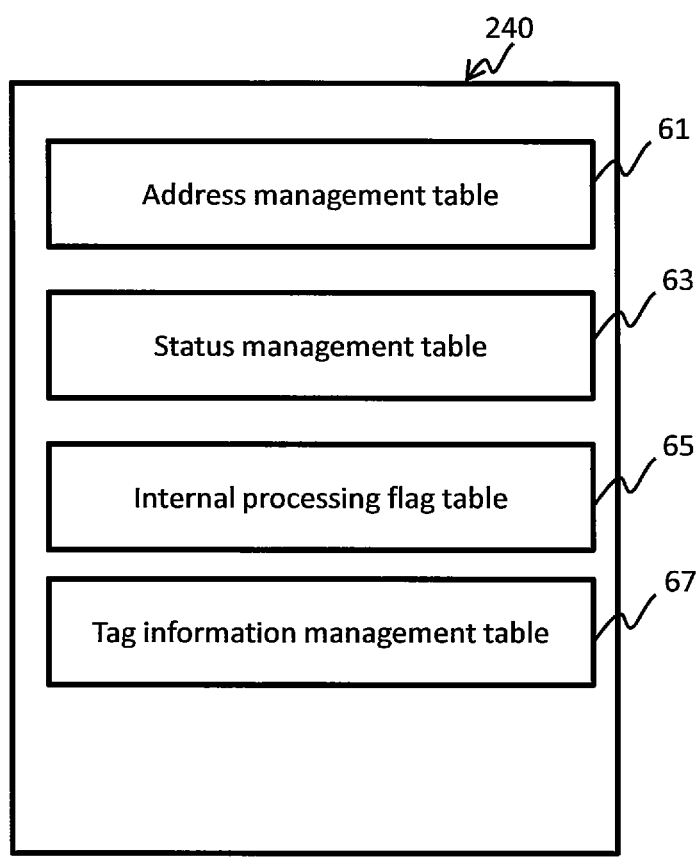
FIG. 6 is a diagram showing tables stored in a cache memory inside the storage controller.

FIG. 6 is a diagram showing tables, which are stored in the CM 240 inside the storage controller 200.

The CM 240 stores an address management table 61, a status management table 63, an internal processing flag table 65, and a tag information management table 67.

FIG. 7 is a diagram showing the address management table 61.

The address management table 61 shows the corresponding relationship between the RAID group 320 and the LU based on the RAID group 320. Specifically, for example, the address management table 61 comprises a RG 701, a LBA 702, a LUN 703, and a FMD 704 for each RAID group 320.

The RG 701 shows the ID of a RAID group 320. The LBA 702 shows a range of addresses in the RAID group 320. The LUN 703 is the number of a LU based on the RAID group 320. The FMD 704 shows the IDs of multiple FMDs, which comprise the RAID group 320.

The MP 260, in accordance with referencing the address management table 61, can compute either a write-destination or a read-source LBA based on a LU and a LBA specified in an I/O request from the host 10, and can identify a write-destination or a read-source of either one or multiple FMDs 330.

FIG. 8 is a diagram showing the status management table 63.

The status management table 63 shows a state of a RAID group 320. Specifically, for example, the status management table 63 associates an ID (RG ID) 801 of each RAID group 320 with a status 802 of each RAID group 320. The status 802, for example, may be "Normal", which denotes that the RAID group 320 is operating normally, that is, all of the FMDs 330 in the RAID group 320 are in an operational state, and "maintenance in progress", which denotes that any one or more FMDs 330 in the RAID group 320 are in the internal processing state. The internal processing state refers to the state in which the RC process, the refresh process, or other such internal processing is being executed.

FIG. 9 is a diagram showing the internal processing flag table 65.

The internal processing flag table 65 shows the state of a FMD 330. Specifically, for example, the internal processing flag table 65 associates an ID (FMD ID) 901 of each FMD 330 with a flag 902, which represents the state of each FMD 330.

The FMD ID 901 identifies each FMD 330 in accordance with denoting the location of the FMD 330 inside the storage unit 300. Specifically, for example, FMD "01/02" is the second FMD of the RAID group #01. The flag 902, for example, may be "Normal", which denotes that the FMD 330 is operating normally, "RC", which denotes that the FMD 330 is executing RC processing or "refresh", which denotes that the FMD 330 is executing refresh processing. In a case where the FMD 330 is executing other internal processing, that is, a case in which the FMD 330 is not operating normally for a reason other than internal processing, the flag 902 may be configured to show these states.

FIG. 10 is a diagram showing the tag information management table 67.

The tag information management table 67 shows the load status of an FMD 330. Specifically, for example, the tag information management table 67 associates an ID (FMD ID) 1001 of each FMD with a tag 1002. The FMD ID 1001 identifies each FMD 330 in accordance with showing the location of the FMD 330 inside the storage unit 300. Specifically, for example, the FMD "01/02" is the second FMD in the RAID group #01. The tag 1002 shows the load status of each FMD 330. The load status, for example, is the number of commands stored in each FMD 330 queue as shown in the drawing. However, the load status is not limited to this, and, for example, may be the response time with respect to each FMD 330 command, or may be another element.

Figure 11:
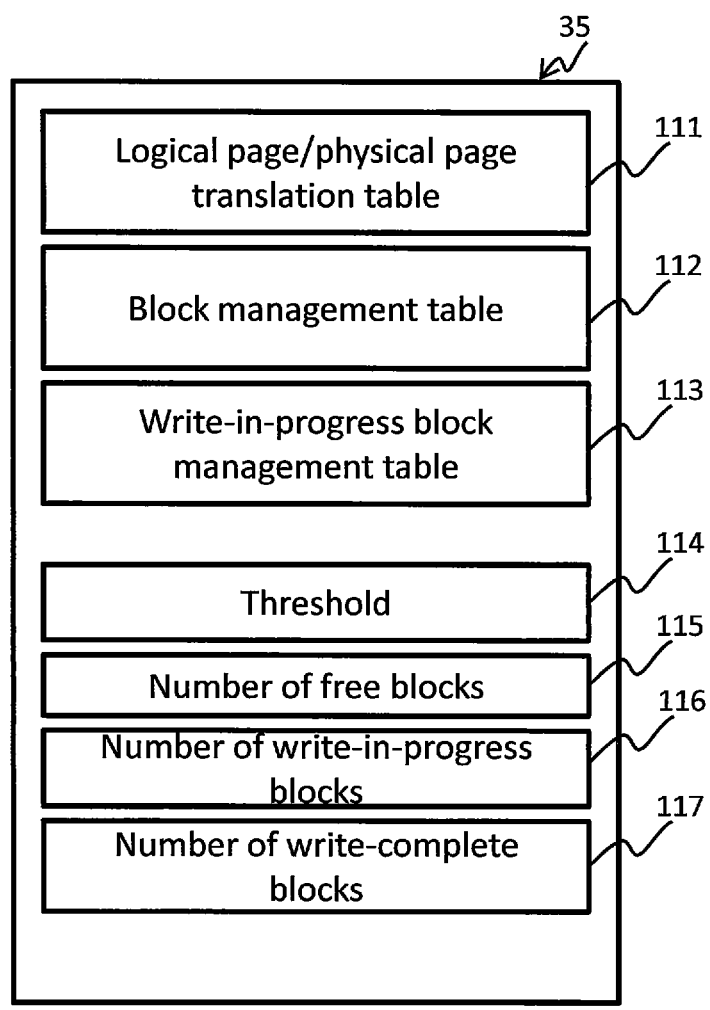
FIG. 11 shows various types of information stored in a cache memory chip of each FMD.

FIG. 11 shows various types of information stored in the cache memory chip 36 of each FMD 330.

The cache memory chip 36, for example, stores a logical page/physical page translation table 111, a block management table 112, a write-in-progress block management table 113, a threshold 114, a number of free blocks 115, a number of write-in-progress blocks 116, and a number of write-complete blocks 117. The logical page/physical page translation table 111, the block management table 112, and the write-in-progress block management table 113 will be explained below by referring to the drawings. The threshold 114 is a value, which constitutes a criterion for whether or not internal processing is to be performed. And the threshold 114 is a value, which constitutes a criterion for whether or not RC is to be performed. The threshold 114 for a certain criterion may be one value or may be multiple values. Specifically, for example, the threshold 114 may be configured to a threshold of 30% in accordance with the percentage of free pages relative to the number of pages comprising one block, or may be configured to a threshold of 50% in accordance with the percentage of invalid pages relative to the number of pages comprising one block. The number of free blocks 115 respectively shows the number of free blocks (that is, blocks having only free pages) in each FMD 330. The number of write-in-progress blocks 116 respectively shows the number of blocks comprising a page(s) for which a write is currently being executed in each FMD 330. The number of write-complete blocks 117 respectively shows the number of block for which a write has been completed in each FMD 330 (that is, a block, which is not a free block and is not a write-in-progress block).

FIG. 12 is a diagram showing the logical page/physical page translation table 111.

The logical page/physical page translation table 111 is a table in which an association has been created for a logical page comprising a block of a FMD 330 for each of multiple logical pages comprising a LU. Specifically, for example, the logical page/physical page translation table 111 associates the ID 1201 of a logical page of a LU based on a RAID group 320 with the ID 1202 of a page (physical page) comprising a block of a FM chip. In the example shown in the drawing, the physical page 6350 is allocated to the logical page 5, and a physical page is not allocated to the logical page 0.

FIG. 13 is a diagram showing a block management table 112.

The block management table 112 shows the number of erases and the number of valid pages in each block. Specifically, for example, the block management table 112 associates the number of rewrites 1302 with the number of valid pages 1303 for each block. A block ID 1301 is an identifier for uniquely identifying a block. The number of rewrites 1302 shows the number of times that the corresponding block has been rewritten, that is, the number of erases in accordance with internal processing. The number of valid pages 1303 shows the number of valid pages in the corresponding block.

FIG. 14 is a diagram showing the write-in-progress block management table 113.

The write-in-progress block management table 113 shows the first page in a block.

The write-in-progress block management table 113 associates a block ID 1401 with a write-destination first page 1402 for each block. The block ID 1401 is an identifier for uniquely identifying a block. The first page 1402 shows an ID of a first page of the free pages of the corresponding block.

Figure 15:
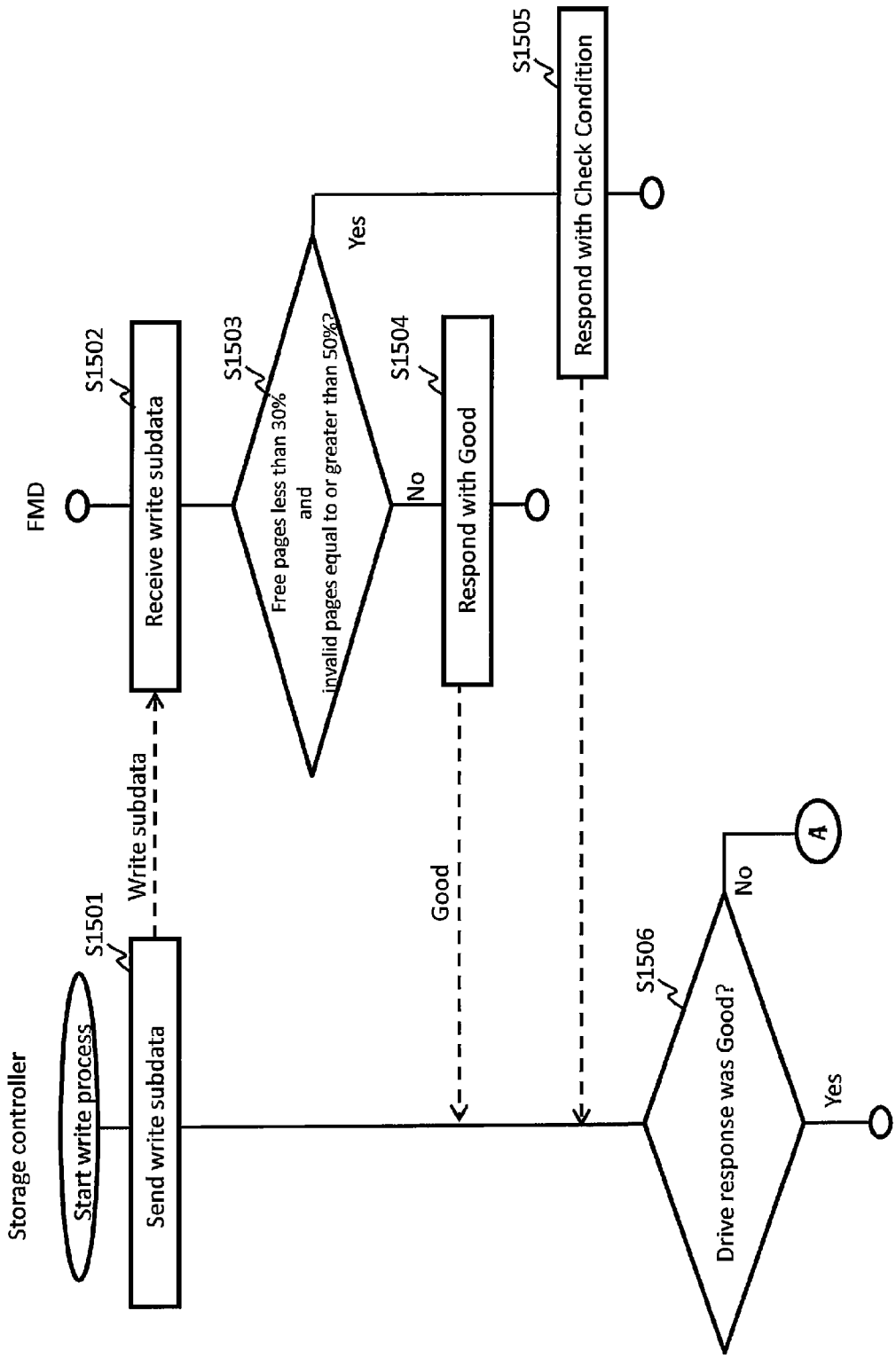
FIG. 15 is a partial flowchart of a write process related to Example 1.

FIG. 15 is a partial flowchart of a write process related to Example 1.

A write process is started when the storage controller 200 has received a write request from the host 10.

Upon receiving the write request, the storage controller 200 references the address management table 61 and identifies a write-destination FMD (hereinafter referred to as the target FMD in the explanation of this write process) 330 and LBA based on the write request from the host 10.

In Step S1501, the storage controller 200 sends the target FMD 330 a write command comprising the identified LBA and write subdata based on the write request from the host 10.

In Step S1502, the FM controller (hereinafter referred to as the target FM controller in the explanation referencing FIGS. 15 and 16) 331 inside the target FMD 330 receives the write command and the write subdata from the storage controller 200, references the logical page/physical page translation table 111, and identifies a write-destination block and a page from the logical area (for example, logical page) to which the LBA specified in the write command belongs. Then, the target FM controller 331 stores the write subdata in the write-destination page of the identified write-destination block.

In Step S1503, the target FM controller 331 determines the state of the write-destination block identified in Step S1502. Specifically, for example, the target FM controller 331 references the threshold 114 and determines whether or not free pages account for less than 30% of the write-destination block, and, in addition, whether or not invalid pages account for equal to or greater than 50% of the write-destination block. In a case where the result of the determination is that free pages account for less than 30% of the write-destination block, but invalid pages do not account for equal to or greater than 50% of the write-destination block (that is, a case in which at least one of the conditions stipulating that free pages account for less than 30% of the write-destination block and that invalid pages account for equal to or greater than 50% of the write-destination block has not been satisfied) (S1503: No), the target FM controller 331 proceeds to Step S1504. Then, in Step S1504, the target FMD 330 sends the Good response (a response comprising information that RC processing is not necessary) to the storage controller 200.

Alternatively, in a case where free pages account for less than 30% of the write-destination block, and, in addition, invalid pages account for equal to or greater than 50% of the write-destination block (S1503: Yes), the target FM controller 331 proceeds to Step S1505, and the target FM controller 331 sends the storage controller 200 a response to that effect (a response comprising information to the effect that RC processing is necessary) as the Check Condition response. In a case where an error has been detected or some other type of trouble has occurred in the relevant block, the target FM controller 331 may proceed to Step S1505 regardless of the determination in Step S1503, and information to that effect (for example, error information) may be included in the Check Condition response. The information included in the Check Condition response, for example, may be identified using a code.

In Step S1506, the storage controller 200 determines whether or not the response received in either Step S1504 or Step S1505 is the Good response. In a case where the result of the determination is that the received response was the Good response (S1506: Yes), the storage controller 200 ends the processing and waits for the next I/O request.

Alternatively, in a case where the result of the determination is that the received response was the Check Condition response (S1506: No), the storage controller 200 advances the processing to Step S1508 (refer to FIG. 16).

In FIG. 15, in a case where the storage controller 200 sends a command (a write command or a RC execution command) to the FMD 330, the value of the tag information (the information in the tag information management table 67) 1002 corresponding to the relevant FMD 330 may be increased by one, and in a case where a response with respect to the relevant command (for example, the Good response) is received from the relevant FMD 330, the value of the tag information 1002 corresponding to the relevant FMD 330 may be decreased by one.

Figure 16:
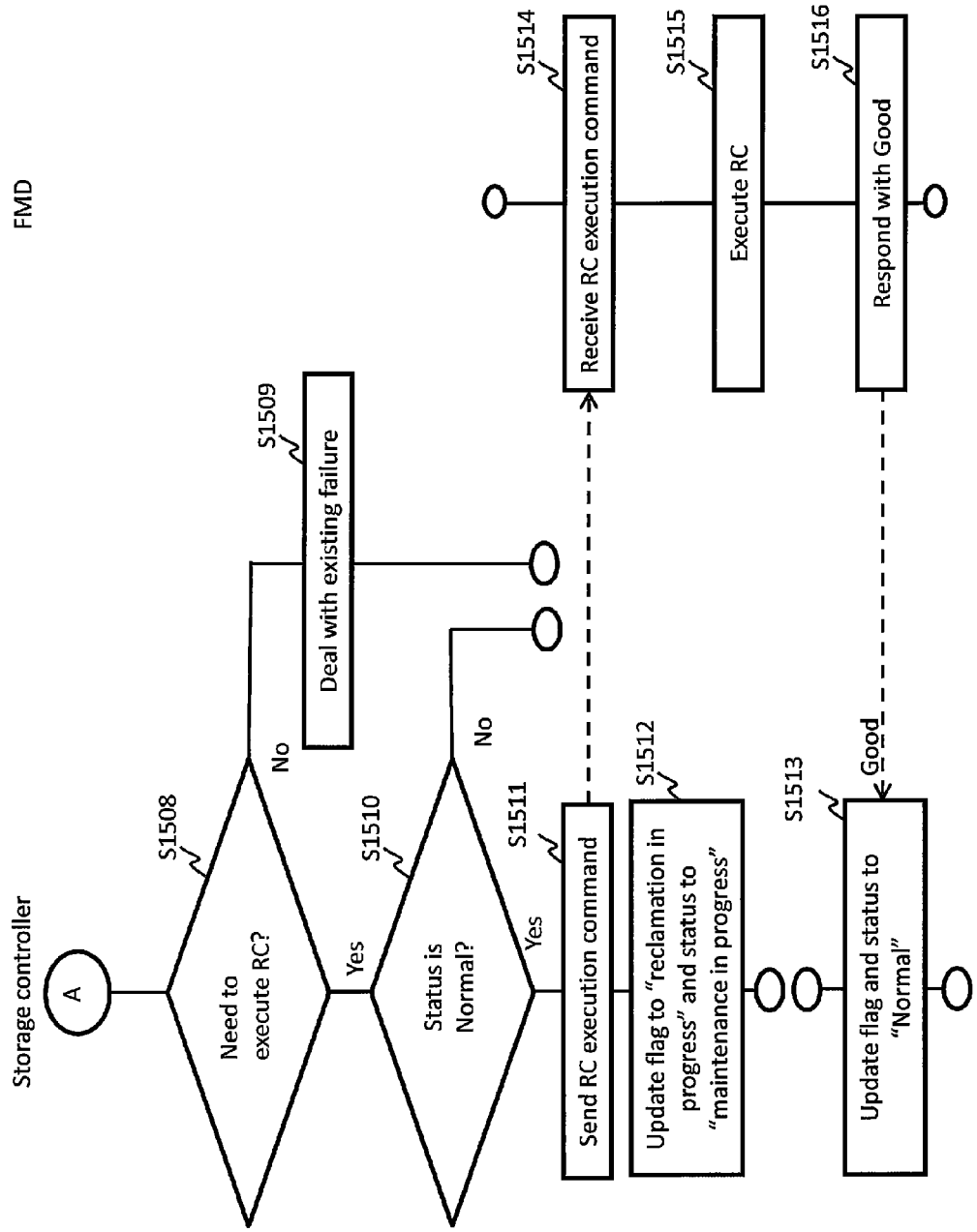
FIG. 16 is the remainder of the flowchart of the write process related to Example 1.

FIG. 16 is the remainder of the flowchart of the write process related to Example 1.

In Step S1508, the storage controller 200 determines whether or not RC processing is necessary based on the Check Condition response. Specifically, for example, the storage controller 200 determines that RC processing is not necessary when the Check Condition response comprises information denoting an error, which will not be resolved by performing the RC process, and in a case other than that, determines that RC processing is necessary.

In a case where the result of the determination of S1508 is that RC processing is not necessary (S1508: No), the storage controller 200 proceeds to Step S1509. In accordance with this, the write-destination block may not require RC processing, but an error of some sort may have occurred. For this reason, the storage controller 200 performs a known failure countermeasure process and ends the processing.

Alternatively, in a case where the result of the determination of S1508 is that RC processing is necessary (S1508: Yes), the storage controller 200 advances the processing to Step S1510.

In Step S1510, the storage controller 200 references the status management table 63 and determines whether or not the status of the RAID group 320 to which the target FMD 330 belongs is "Normal".

In a case where the result of the determination of S1510 is that the status is "Normal" (S1510: Yes), the storage controller 200 moves to Step S1511.

In Step S1511, the storage controller 200 sends the RC execution command to the target FMD 330. In a case where the status is "Normal", there are no FMDs 330 executing either internal processing, such as the RC process or the refresh process, or failure countermeasure processing in the RAID group 320 to which the target FMD 330 belongs, and as such, when Step S1511 is performed, one FMD 330 will be executing either internal processing or failure countermeasure processing in the RAID group 320.

In Step S1512, the storage controller 200 updates the flag of the relevant FMD 330 in the internal processing flag table 65 to "reclamation in progress", and, in addition, updates the status of the RAID group 320 to which the target FMD 330 belongs to "maintenance in progress" in the status management table 63 and ends the processing.

Alternatively, in a case where the result of the determination of S1510 is that the status is not "Normal" (that is, in the case of "maintenance in progress" or the like) (S1510: No), the storage controller 200 ends the processing. When the status of the RAID group 320 to which the target FMD 330 belongs is not "Normal", this signifies that in the RAID group 320 one of the FMDs 330 other than the target FMD 330 is executing either internal processing or other failure countermeasure processing. In accordance with this, since the number of FMDs 330 executing either internal processing or failure countermeasure processing in the RAID group 320 is equal to or less than one, in the read process, which will be described further below, it is possible to execute either a normal read or a correction read at all times, preventing read response delay.

In Step S1514, the target FM controller 331 receives the RC execution command. In Step S1515, the target FM controller 331 executes RC processing in accordance with this RC execution command. Then, in Step S1516, the target FM controller 331 sends the Good response (a response to the effect that the RC process is completed) to the storage controller 200.

In Step S1513, the storage controller 200 receives the Good response from the target FM controller 331, updates the flag of the target FMD in the internal processing flag table 65 to "Normal", and, in addition, updates the status of the RAID group 320 to which the target FMD 330 belongs to "Normal" in the status management table 63.

According to the processing described hereinabove, the storage controller 200 is able to discern the state of the FMD 330 in accordance with the storage controller 200 storing the status management table 63 and the internal processing flag table 65. In addition, the storage controller 200 can more accurately discern the state of the FMD 330 in accordance with the target FM controller 331 conveying to the storage controller 200 that the state of the target FMD 330 was changed in accordance with a write process, and the storage controller 200 updating the tables 63 and 65. Thus, in accordance with the storage controller 200 managing the state of the FMD 330 and the storage controller 200 issuing RC process execution instructions, the number of FMDs 330 executing either internal processing or failure countermeasure processing in the RAID group is maintained at equal to or less than one, thereby enabling either a normal read or a correction read to be executed at all times, and making it possible to prevent read response delay. In addition, in accordance with the RC process execution condition being that free pages account for less than 30% of the write-destination block, and, in addition, that invalid pages account for equal to or greater than 50% of the write-destination block, RC processing can be performed at an appropriate time.

In the above explanation, only a case in which there was one write-destination FMD 330 was explained, but the write-destination FMD 330 is not limited to one unit. In a case where there are multiple write-destination FMDs 330, for example, the configuration may be such that write processing is started concurrently for multiple FMDs 330. In accordance with this, for example, in a case where there are multiple FMDs (that is, the FMDs for which a determination of Yes was made in Step S1510) 330 to which the RC execution command should be sent, the storage controller 200 may sequentially perform the series of processes from Step S1511 through S1513 with respect to these FMDs 330 once every prescribed time period.

In this example, a case of RC processing was explained as an example of internal processing, but internal processing may be a process other than the RC process, such as the refresh process. In addition, the FM controller 331 may send the storage controller 200 its own load status included in either the Good response or the Check Condition response, or in some other way. The load status, for example, may be the number of commands held in the FM controller 331 queue for each FMD 330 sent as-is or converted to a prescribed numeric value as tag information. In a case where tag information has been received for its own FMD 330 from the target FM controller 331, the storage controller 200, for example, updates the tag information 1002 column corresponding to the target FMD 330 in the tag information management table 67. The tag information may be the response time to a command of FM controller 331 or information, which quantifies another element.

Figure 17:
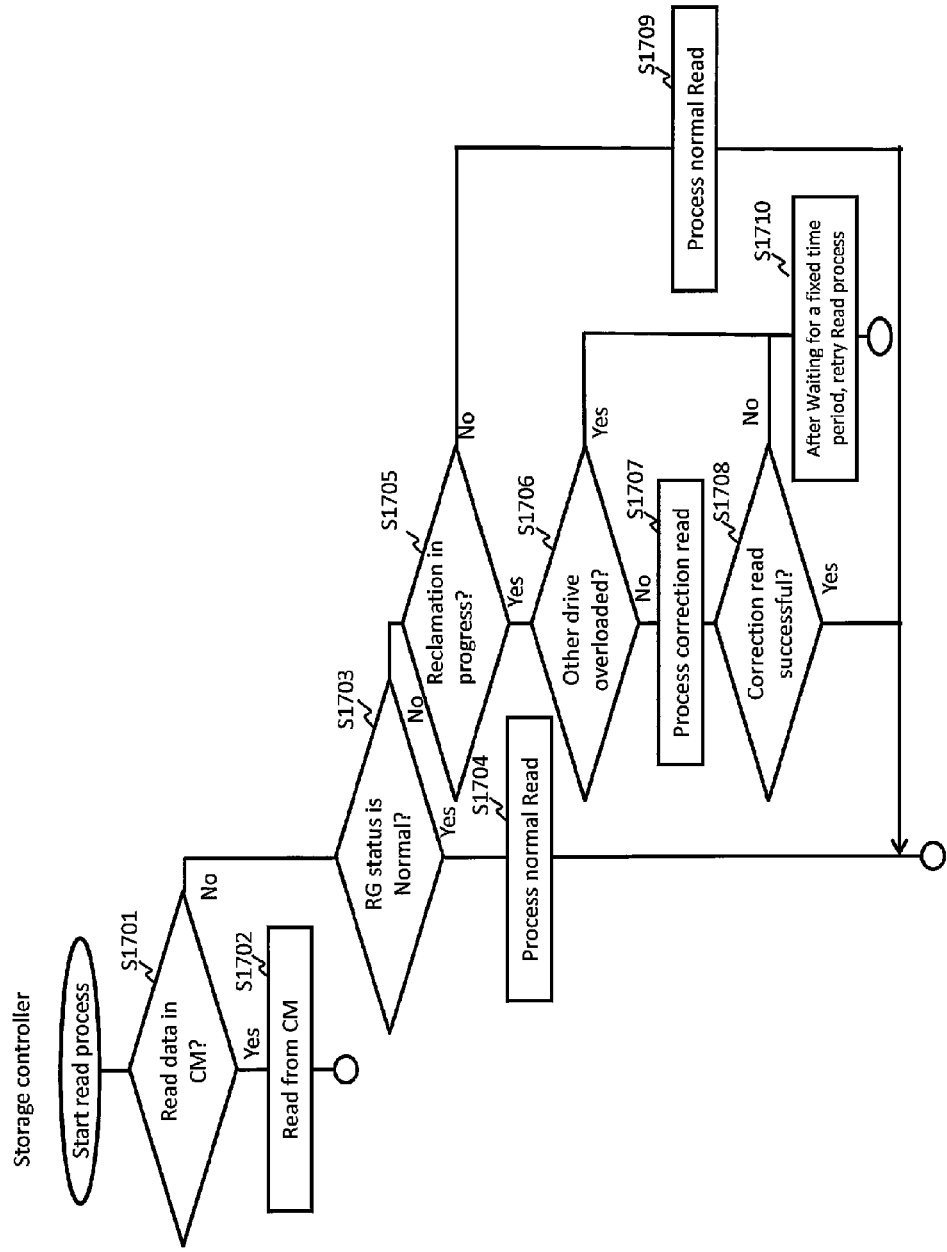
FIG. 17 shows a flowchart of a read process related to Example 1.

FIG. 17 shows a flowchart of a read process related to Example 1.

The read process is started when the storage controller 200 receives a read request from the host 10.

In Step S1701, the storage controller 200, based on the read request from the host 10, determines whether or not read data is stored in the CM 240.

In a case where the result of the determination of S1701 is that read data is stored in the CM 240 (S1701: Yes), the storage controller 200 sends the host 10 the read data in the CM 240 in Step S1702, and ends the processing.

Alternatively, in a case where the result of the determination of S1701 is that read data is not stored in the CM 240 (S1701: No), the storage controller 200 advances the processing to Step S1703.

In Step S1703, the storage controller 200 determines whether or not the status of the RAID group 320 to which the read-source FMD 330 belongs is "Normal". Specifically, for example, the storage controller 200 references the address management table 61, identifies the read-source RAID group 320 and FMD 330 (hereinafter this RAID group and FMD will be referred to as the target RAID group and the target FMD in the explanation of FIG. 17) based on the read request from the host 10, and determines whether or not the status of the target RAID group 320 is "Normal".

In a case where the result of the determination of S1703 is that the status of the target RAID group 320 is "Normal" (S1703: Yes), the storage controller 200 moves to Step S1704 and performs a normal read process. In the normal read process, the read command is only sent to the target FMD 330 from among the multiple FMDs, which comprise the target RAID group 320. In accordance with this, the storage controller 200 receives read subdata from the target FMD 330, and based thereon, stores the read data in the CM 240 and sends the read data in the CM 240 to the host 10, which was the source of the read request. The read subdata is data, which constitutes the basis of the read data sent to the host 10 in response to the read request from the host 10, and specifically, is the read data, a portion of the read data, or parity.

Alternatively, in a case where the result of the determination of S1703 is that the status of the target RAID group 320 is other than "Normal" (S1703: No), the storage controller 200 advances the processing to Step S1705.

In Step S1705, the storage controller 200 references the internal processing flag table 65 and determines whether or not the target FMD 330 is executing RC processing (whether or not the target FMD 330 status is "reclamation in progress").

In a case where the result of the determination of S1705 is that the target FMD 330 is executing RC processing (S1705: Yes), the storage controller 200 advances the processing to Step S1706.

Alternatively, in a case where the result of the determination of S1705 is that the target FMD 330 is not executing RC processing (S1705: No), the storage controller 200 performs a normal read process in Step S1709. A case in which the target FMD 330 is not executing RC processing signifies that any of the FMDs 330 other than the target FMD 330 in the target RAID group is executing RC processing. For this reason, the storage controller 200 can execute the normal read process for the target FMD 330.

In Step S1706, the storage controller 200 determines whether or not a FMD 330 other than the target FMD 330 in the target RAID group 320 is in an overload state. Specifically, for example, the storage controller 200 references the tag information management table 67 and determines whether or not there is an FMD 330 other than the target FMD 330 for which the tag information is equal to or larger than "1", that is, whether or not there is an FMD 330 other than the target FMD 330 for which a command is being held in the queue.

In a case where the result of the determination of S1706 is that there is not an overload state FMD 330 other than the target FMD 330 (S1706: No), the storage controller 200 advances the processing to Step S1707.

Alternatively, in a case where the result of the determination of S1706 is that there is an overload state FMD 330 other than the target FMD 330 (S1706: Yes), the storage controller 200 advances to Step S1710, and after waiting for a fixed period of time, returns to Step S1701 and performs read processing once again.

In Step S1707, the storage controller 200 executes a correction read process. The correction read process sends multiple read commands to each of multiple FMDs 330 other than the target FMD 330 in the read-source RAID group 320. The storage controller 200 receives multiple read subdata from these multiple FMDs 330, stores read data based thereon in the CM 240, and sends the read data in the CM 240 to the host 10, which is the source of the read request.

In Step S1708, the storage controller 200 determines whether or not the correction read process of Step S1707 was successful.

In a case where the result of the determination of S1708 is that the correction read process was successful (S1708: Yes), the storage controller 200 ends the processing.

Alternatively, in a case where the result of the determination of S1708 is that the correction read process was not successful (S1708: No), the storage controller 200 moves to Step S1710, waits for a fixed period of time, returns to Step S1701, and performs read processing once again.

According to the processing described hereinabove, the storage controller 200 is able to discern the state of the FMD 330 in accordance with the storage controller 200 storing the status management table 63 and the internal processing flag table 65, and is able to appropriately make a determination as to whether to perform a normal read process, to perform a correction read process, or to resume read processing after waiting for a fixed period of time. This makes it possible to prevent response delay at the time of a read. Specifically, the storage controller 200 can learn whether or not the target FMD 330 is in the midst of RC processing prior to sending a read command, and in a case where the target FMD 330 is executing RC processing, can perform a correction read. Thus, the storage controller 200 sends the read command to multiple FMDs 330 other than the target FMD 330 in the read-source RAID group 320. In other words, the read command is not sent to the FMD 330 that is in the midst of RC processing. This makes it possible to prevent response delay at the time of a read. Specifically, after receiving a read request from the host, the storage controller 200 can avoid prolonging the return of a response to the host.

In FIG. 17, in a case where a command (a read command) has been sent to the FMD 330, the storage controller 200 may increase by 1 the value of the tag information (the information in the tag information management table 67) 1002 corresponding to the relevant FMD 330, and in a case where a response to the relevant command (for example, the Good response) has been received from the relevant FMD 330, may decrease by 1 the value of the tag information 1002 corresponding to the relevant FMD 330.

In the above-described example, the FMD 330 comprises an interface 39 for receiving the RC execution command, and the storage controller 200 comprises an interface 38 for sending the RC execution command. This makes it possible to execute RC processing, which is one of the internal processes, in accordance with a write command from the storage controller 200.

In the above-described example, information constituting the basis of a determination as to the need for RC process execution (that is, the information, which is sent to the storage controller 200 from the FMD 330, and is used by the storage controller 200 in determining whether or not to execute RC processing in the FMD 330) is included in a response (the response sent from the FMD 330 to the storage controller 200) to a command sent to the FMD 330 from the storage controller 200 for a purpose other than acquiring the information, which constitutes the basis of the determination as to the need to execute RC processing. For this reason, it is not necessary to provide a command for requesting the acquisition of information for determining the need for the RC. Also, the communication bandwidth between the storage controller 200 and the FMD 330 is not used solely for sending the information for determining the need for the RC.

Specifically, in this example, the information, which constitutes the basis of the determination as to the need to execute RC processing, is included in the write response (the response to the write command). The FMD 330, in the processing performed in a case where a write command has been received, detects the state of the storage area comprising the write destination (for example, the write-destination block, the FM chip comprising the write-destination block, and either two or more FM chips, which include this FM chip, or all the FM chips, which include these two or more FM chips), and sends the Check Condition response comprising information based on the detected state. Determining the state of the storage area at the time of a write to this storage area is more efficient than going to the trouble of detecting the state of this storage area at another time when there is no need to write to this storage area.

In this example, after it has been accurately discerned that RC processing is being executed, it is decided that the read to this block will be a correction read. It is thus possible to prevent the generation of an unnecessary correction read. Since the correction read puts more of a load on the storage controller 200 than a normal read, holding correction reads to the minimum can lower the load on the storage controller 200 while preventing read delay.

In this example, a case in which the RC process is performed was explained as internal processing, but processes other than the RC process, such as the refresh process, may be applied to this example as internal processing.

Example 2

Next, Example 2 will be explained based on the drawings. In so doing, the points of difference with Example 1 will mainly be explained, and explanations of the points in common with Example 1 will be simplified or omitted (The same will hold true for Example 3 and subsequent examples.) In Example 1, the storage controller 200 instructed the execution of RC processing in block units, but in Example 2, the storage controller 200 instructs the execution of RC processing in either FMD units or FM module units. The execution of RC processing in either FMD units or FM module units refers to executing RC processing in block units for multiple blocks until the number of free blocks is equal to or larger than a prescribed value.

Figure 18:
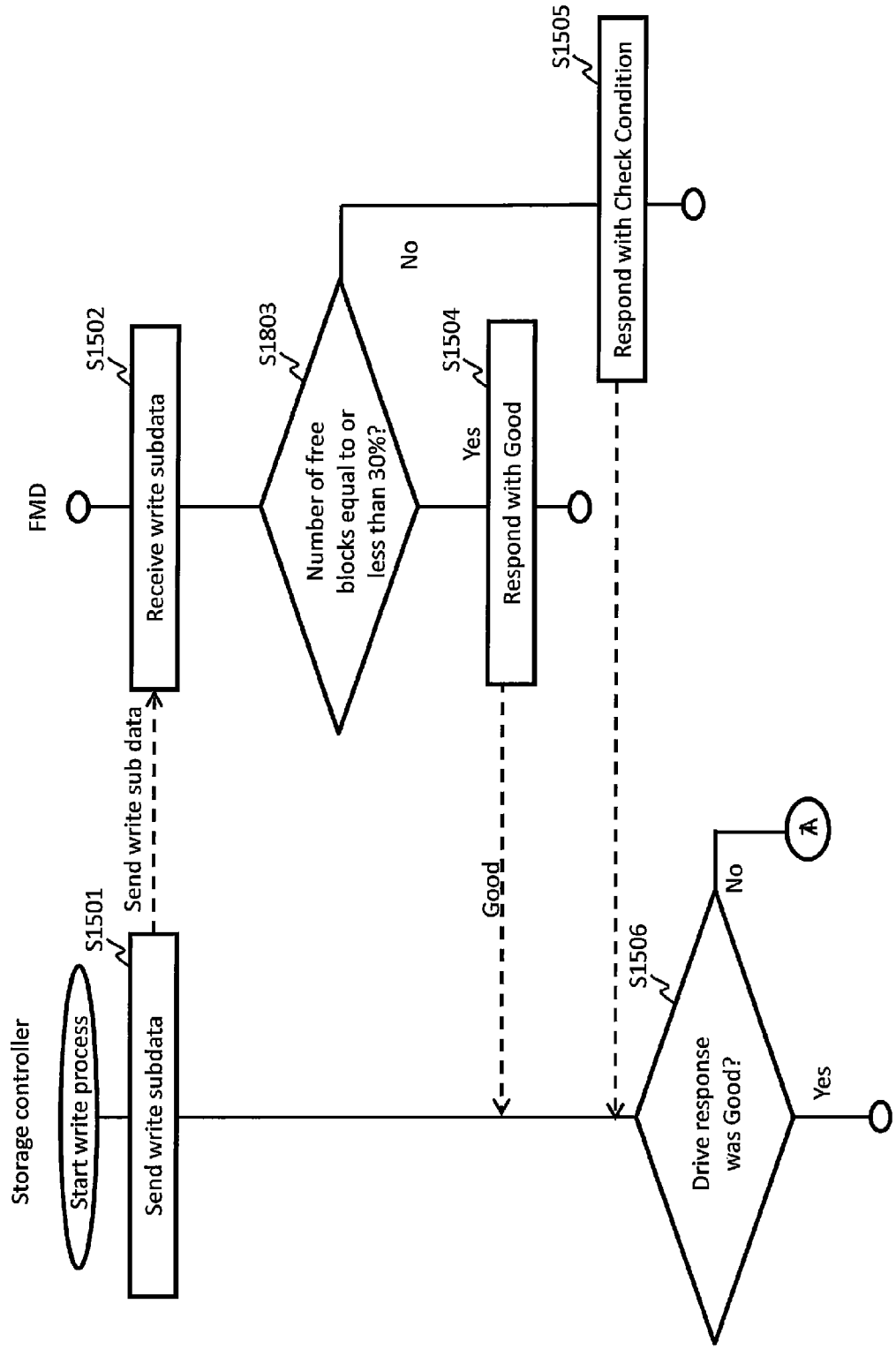
FIG. 18 is a partial flowchart of a write process related to Example 2.

In the processing shown in FIG. 18, Steps S1803 through S1805 are performed instead of Steps S1503 through S1505.

In Steps S1501 through S1502, a target FMD (write-destination FMD) 330 write process is performed. Then, in Step S1803, the target FM controller (the FM controller of the target FMD) 331 determines the state of a block of its own FMD 330. Specifically, for example, the target FM controller 331 references the number of free blocks 115 and computes the percentage of the number of free blocks to the total number of blocks comprising its own FMD 330. Then, the target FM controller 331 references the threshold 114, and determines whether or not the computed percentage is equal to or less than the threshold. Specifically, the target FM controller 331, for example, determines whether or not the computed percentage of the number of free blocks relative to the total number of blocks is equal to or less than 30%. In a case where the result of the determination is that the computed percentage of the number of free blocks relative to the total number of blocks of its own FMD 330 is equal to or less than 30% (S1803: Yes), the target FM controller 331 proceeds to Step S1504, and sends the storage controller 200 a response to that effect (a response including information to the effect that RC processing is not necessary).

Alternatively, in a case where the result of the determination is that the percentage of the number of free blocks relative to the total number of blocks included in FM 332 of its own FMD 330 is larger than 30% (S1803: No), the target FM controller 331 proceeds to Step S1505 and sends the storage controller 200 the Check Condition response (a response including information to the effect that RC processing is necessary). In a case where trouble has occurred in the relevant block, such as an error having been detected, the target FM controller 331 may proceed to Step S1505 regardless of the determination of Step S1803, and may include information to this effect (for example, error information) in the Check Condition response. The information included in the Check Condition response, for example, may be identified using a code.

The effects according to the above processing are basically the same as those of Example 1. However, in this example, the condition when making a determination as to whether or not to execute the RC process is that the percentage of the number of free blocks relative to the total number of blocks of the FMD 330 be equal to or less than a prescribed value (for example, equal to or less than 30%). This makes it possible to facilitate the determination on the FMD 330 side.

The storage controller 200, subsequent to having instructed the execution of RC processing in the FMD 330, performs a correction read with respect to this FMD 330 until the percentage of the number of free blocks becomes equal to or larger than the prescribed value. In a case where the free blocks become equal to or larger than the prescribed value, the FM controller 331 notifies the storage controller 200, and the storage controller 200, having received the notification, performs a normal read subsequent thereto. In addition, the storage controller 200, after sending a reclamation instruction to the target FMD 330, may perform a correction read during a prescribed time period, and after the prescribed time period has elapsed, may perform a normal read.

The storage controller 200 may stagger the timing for instructing the execution of RC processing among multiple FMDs 330. A correction read cannot be executed when multiple FMDs 330 in the RAID group 320 are executing RC processing. Thus, the time during which data is unable to be read can be shortened by staggering the timing of the RC processing.

The storage controller 200 may instruct the execution of RC processing for each FM module 40 based on the percentage of the number of free blocks relative to the total number of blocks inside the FM module 40. In accordance with this, a read to the FM module 40 executing RC processing is performed using a correction read, and a normal read is performed for an FM module 40, which is not executing RC processing. The storage controller 200 makes a determination as to whether or not RC processing is being executed by identifying a logical address range corresponding to the storage area included in the FM module 40. The FMD 330 may notify the storage controller 200 of the logical address range corresponding to a certain FM module 40.

The correction read places more of a load on the storage controller 200 than the normal read, but the increase in the load on the storage controller 200 can be held in check by restricting the range of logical addresses executing the correction read.

The storage controller 200 may stagger the timing for instructing multiple FM modules 40 to perform reclamations. This makes it possible to reduce the concurrent generation of correction reads in accordance with reads to multiple FM modules 40, enabling the load on the storage controller 200 to be alleviated.

In this example, a case in which RC processing is performed was explained as the internal processing, but processes other than the RC process, such as the refresh process, may be applied to this example as the internal processing.

Example 3

Next, Example 3 will be explained based on the drawings.

Figure 19:
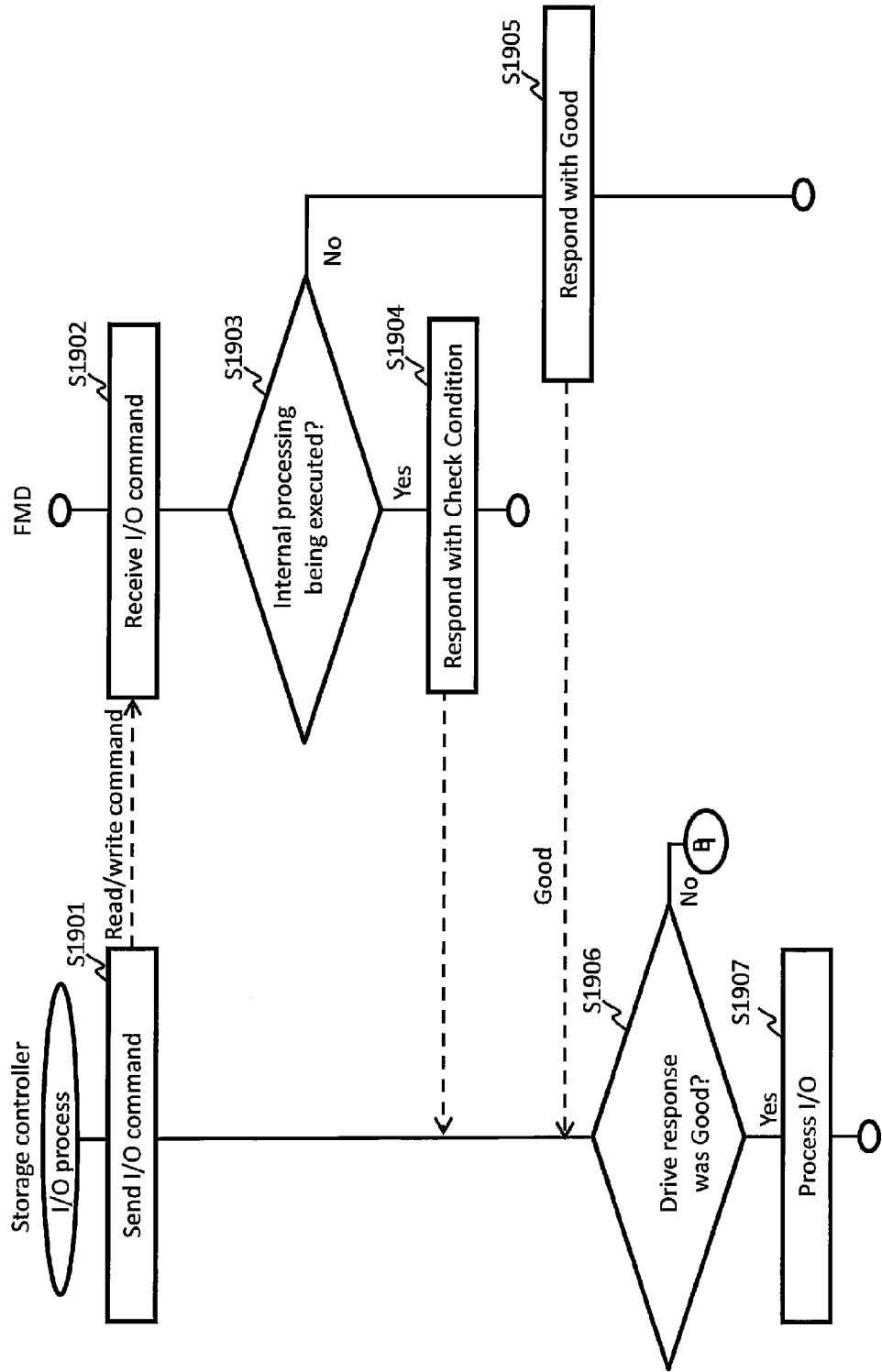
FIG. 19 is a partial flowchart of an I/O process related to Example 3.

FIG. 19 is a partial flowchart of an I/O process (either a read or a write process) related to Example 3.

The I/O process related to Example 3 is performed in accordance with an I/O command from the storage controller 200 in a case where the FMD 330 is autonomously executing internal processing. This I/O process, for example, may be an I/O process corresponding to an I/O command from the storage controller 200, which conforms to an I/O request from the host 10. This I/O process, for example, may also be an I/O process corresponding to an I/O command sent from the storage controller 200 at the time of a normal read process (refer to either S1704 or S1709 of FIG. 17) or a correction read process (refer to S1707 of FIG. 17) explained in the above-described examples.

In Step S1901, the storage controller 200 references the address management table 61, identifies either a read-source or a write-destination RAID group 320, FMD 330 and LBA, which conform to an I/O request from the host 10, and sends an I/O command (either a read or write command) comprising the identified LBA to the identified FMD (hereinafter referred to as the target FMD in the explanation of this process) 330.

In Step S1902, the FM controller (hereinafter the target FM controller in the explanation of this process) 331 of the target FMD 33 receives an I/O command from the storage controller 200.

In Step S1903, the target FM controller 331 determines whether or not it itself is executing internal processing. In a case where the result of the determination is that the target FM controller 331 is executing internal processing (S1903: Yes), the target FM controller 331 proceeds to Step S1904. Alternatively, in a case where the result of the determination is that the target FM controller 331 is not executing internal processing (S1903: No), the target FM controller 331 moves to Step S1905. The internal processing here may be any type of internal process, such as the RC process, the refresh process, or the like.

In Step S1905, the target FM controller 331 sends the storage controller 200 the Good response (a response to the effect that it itself is not performing internal processing).

In Step S1904, the target FM controller 331 sends the storage controller 200 the Check Condition response (a response to the effect that it itself is performing internal processing). In a case where trouble has occurred in the target FMD 330, such as a case in which an error has been detected, the target FM controller 331 may proceed to Step S1906 regardless of the determination in Step S1903, and may include information to this effect (for example, error information) in the Check Condition response. The information included in the Check Condition response, for example, may be identified using a code.

In Step S1906, the storage controller 200 determines whether or not the response received in either Step S1904 or Step S1905 is the Good response. In a case where the result of the determination is that the received response is the Good response (S1906: Yes), the storage controller 200 moves to Step S1907.

Figure 21:
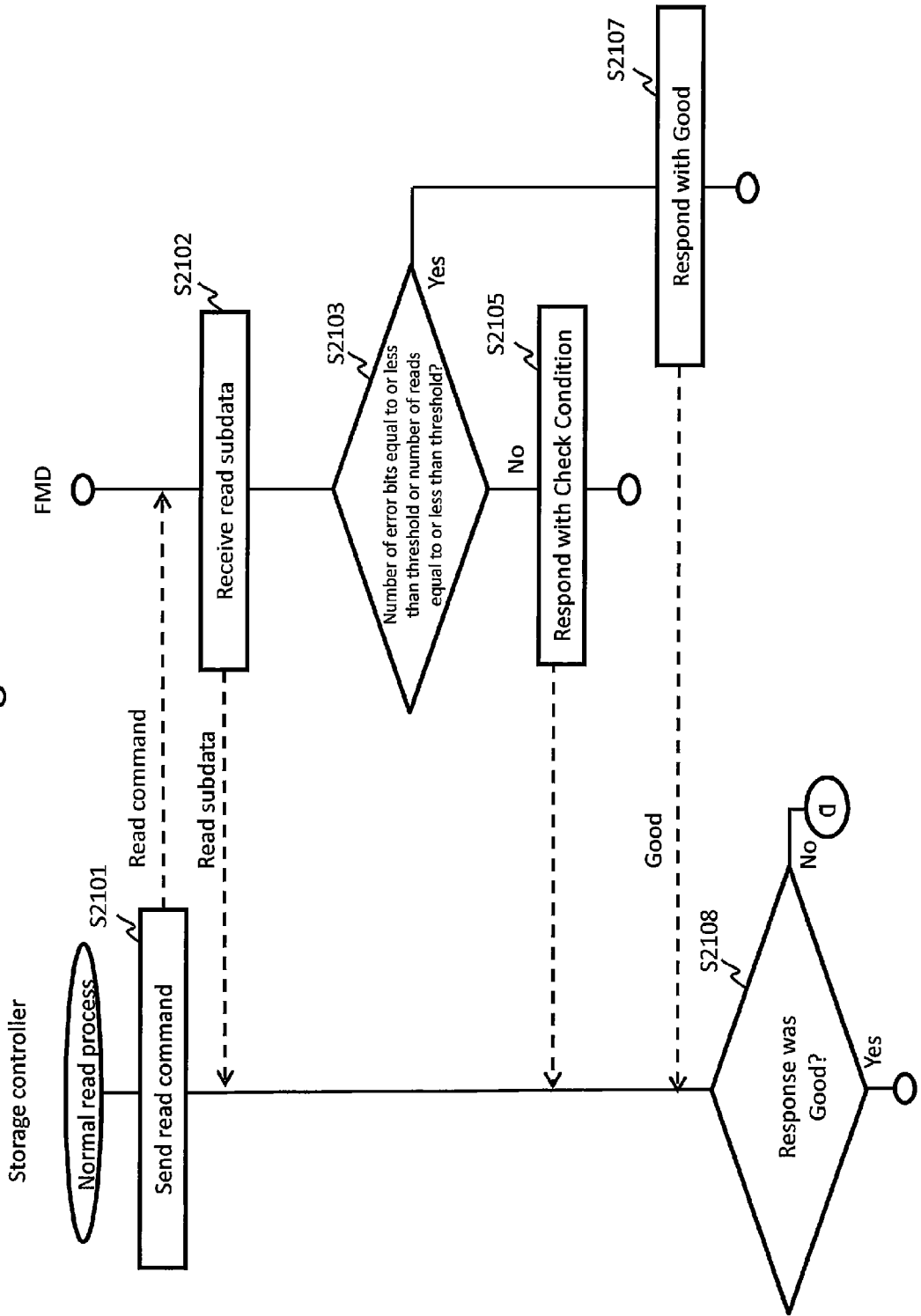
FIG. 21 is a partial flowchart of a read process related to Example 4.

In S1907, the storage controller 200 performs the I/O process. The I/O process may be either a normal read process or a normal write process, the write process explained in either Example 1 or Example 2 (refer to FIGS. 15, 16 and 18), or the read process explained in either Example 1 or Example 2, or in Example 4, which will be described further below (refer to FIGS. 17, 21 and 22).

Alternatively, in a case where the result of the determination is that the received response is the Check Condition response (S1906: No), the storage controller 200 advances the processing to Step S1909 (refer to FIG. 20).

Figure 20:
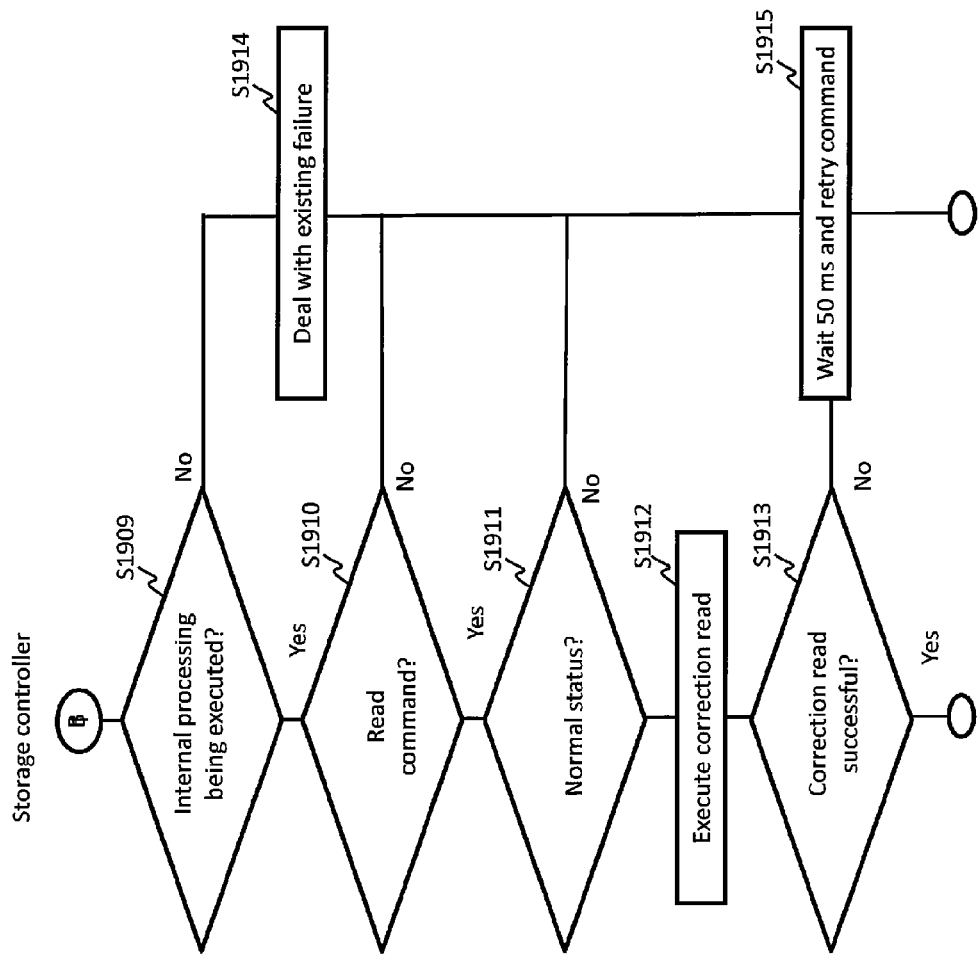
FIG. 20 is the remainder of the flowchart of the I/O process related to Example 3.

FIG. 20 is the remainder of the flowchart of the I/O process related to Example 3.

In Step S1909, the storage controller 200 determines whether or not the target FM controller 331 is executing internal processing. Specifically, for example, the storage controller 200 determines whether or not the target FM controller 331 is executing internal processing based on the Check Condition response received in either Step S1904 or Step S1905. In a case where the result of the determination is that internal processing is being executed (that is, a case in which a response to the effect that the target FM controller 331 is performing internal processing has been received) (S1909: Yes), the storage controller 200 moves to Step S1910.

Alternatively, in a case where the result of the determination is that internal processing is not being executed (a case in which error information has been received) (S1909: No), the storage controller 200 moves to Step S1914. In accordance with this, since it is conceivable that trouble of some sort, such as an error, has occurred in the target FMD 330, the storage controller 200 performs failure countermeasure processing using a known method and ends the processing.

In Step S1910, the storage controller 200 determines whether or not a command received by the target FMD 330 is the read command. In a case where the result of the determination is that the received command is other than the read command (that is, the write command) (S1910: No), the storage controller 200 moves to Step S1915, and, after a fixed period of time (for example, 50 seconds), performs the read process of Step S1901 once again.

Alternatively, in a case where the result of the determination is that the received command is the read command (S1910: Yes), the storage controller 200 moves to Step S1911.

In Step S1911, the storage controller 200 references the status management table 63 and determines whether or not the status of the RAID group 320 to which the target FM controller 331 belongs is "Normal". In a case where the result of the determination is that the status is other than "Normal" (S1911: No), the storage controller 200 moves to Step S1915, and after a fixed period of time (for example, 50 seconds), performs the I/O processing of Step S1901 once again.

Alternatively, in a case where the result of the determination is that the status is "Normal" (S1911: Yes), the storage controller 200 advances the processing to Step S1912. In Step S1912, the storage controller 200 executes a correction read. Specifically, for example, the storage controller 200 sends multiple read commands to each of multiple FMDs 330 other than the target FMD 330 in the read-source RAID group 320, receives multiple read subdata from these multiple FMDs 330, stores read data based thereon in the CM 240, and sends the read data in the CM 240 to the host 10, which is the source of the read request.

In Step S1913, the storage controller 200 determines whether or not the correction read performed in Step S1912 was successful. In a case where the result of the determination is that the correction read was successful (Step S1913: Yes), the storage controller 200 ends the processing. Alternatively, in a case where the correction read was not successful (S1913: No), the storage controller 200 moves to Step S1915, and after waiting for a fixed period of time, performs the read processing of Step S1901 once again.

According to this example, when performing an I/O process (that is, in accordance with sending an I/O command to the FMD 330), the storage controller 200 can discern the state of the FMD 330. That is, the storage controller 200 can determine whether or not the FMD 330 is performing internal processing in accordance with a response from the FM controller 331 with respect to a normal I/O command. For this reason, for example, even in a case where, based on a determination by the FM controller 331 itself, internal processing is being performed, the storage controller 200 can appropriately make a determination as to whether to perform a normal read process, to perform a correction read, or to perform a read process after waiting for a fixed period of time. This makes it possible to prevent response delay at the time of a read. Specifically, the storage controller 200 can learn whether or not the target FMD 330 is executing internal processing, and in a case where the target FMD 330 is executing internal processing, can performs a correction read. Thus, the storage controller 200 sends read commands to multiple FMDs 330 other than the target FMD 330 in the read-source RAID group 320. In other words, the read command is not sent to the FMD 330 that is in the midst of RC processing. This makes it possible to prevent response delay at the time of a read. Specifically, after receiving a read request from the host, the storage controller 200 can avoid prolonging the return of a response to the host.

The internal processing of the FMD 330 can be configured by staggering the execution times so that this processing does not occur concurrently in multiple FMDs 330. In a case where multiple FMDs 330 comprising a RAID group 320 are executing internal processing, the storage controller 200 is unable to read data using the correction read. Staggering the internal processing execution times makes it possible to shorten the time during which the correction read cannot be used.

Example 4

Next, Example 4 will be explained based on the drawings.

Figure 22:
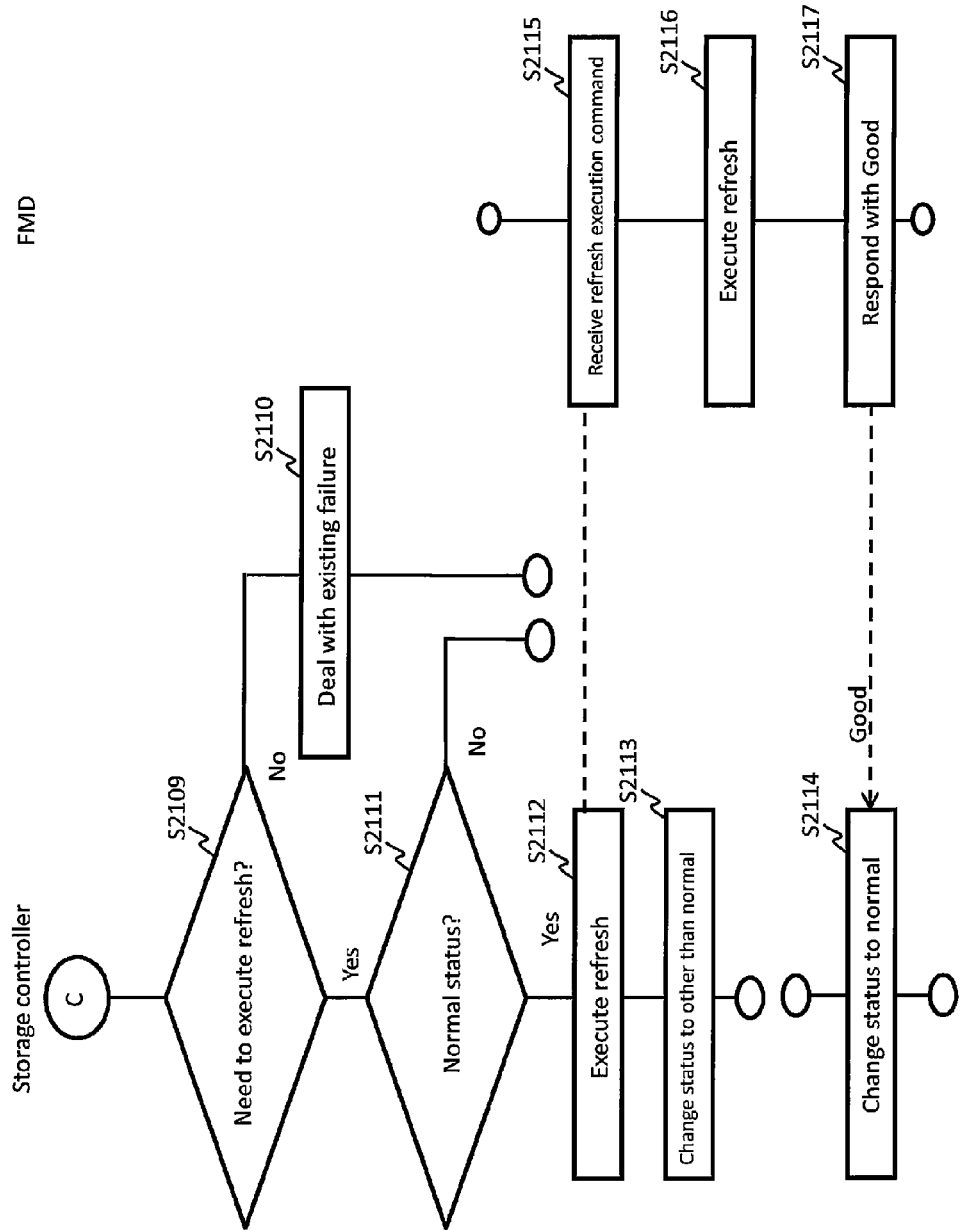
FIG. 22 is the remainder of the flowchart of the read process related to Example 4.

FIG. 22 is a partial flowchart of a read process related to Example 4.

The read process of this example may be performed instead of the normal read process. This read process, for example, may be performed instead of the normal read process explained using FIG. 17.

In Step S2101, the storage controller 200 references the address management table 61, identifies the read-source FMD (hereinafter the target FMD in the explanation of this processing) and the LBA based on the read request from the host 10, and sends a read command including the identified LBA to the target FMD 330.

In Step S2102, the controller of the target FMD (hereinafter referred to as target FM controller in the explanation of this processing) 331 receives the read command from the storage controller 200. Then, the target FM controller 331 analyzes the received read command, references the logical page/physical page translation table 111, and identifies either one or multiple pages (hereinafter referred to as target page in the explanation of this processing) in which read subdata is stored. Then, the target FM controller 331 sends the storage controller 200 the read subdata stored in the target page(s).

In Step S2103, the target FM controller 331 determines the state of the target page(s). Specifically, for example, the target FM controller 331 references the threshold 114 and determines whether or not a number of error bits is equal to or less than a first threshold and/or whether or not a number of cumulative reads is equal to or less than a second threshold for the one or multiple target pages. In a case where the result of the determination is that there is a target page for which the number of error bits is equal to or less than a first threshold and/or the number of cumulative reads is equal to or less than a second threshold (S2103: Yes), the target FM controller 331 moves to Step S2107. Then, in Step S2107, the target FM controller 331 sends the storage controller 200 the Good response (a response including information to the effect that refresh processing is not necessary).

Alternatively, in a case where the result of the determination is that the number of error bits exceeds the first threshold and, in addition, the number of cumulative reads exceeds the second threshold for all of the one or multiple target pages (S2103: No), the target FM controller 331 moves to Step S2105. Then, in Step S2105, the target FM controller 331 sends the storage controller 200 the Check Condition response (a response including information to the effect that refresh processing is necessary). In a case where trouble has occurred in the target FMD 330, such as a case in which an error has been detected, the target FM controller 331 may proceed to Step S2108 regardless of the determination in Step S2105, and may include information to this effect (for example, error information) in the Check Condition response. The information included in the Check Condition response, for example, may be identified using a code.

In Step 2108, the storage controller 200 determines whether or not the response received in either Step S2105 or Step S2107 is the Good response. In a case where the result of the determination is that the received response is the Good response (S2108: Yes), the storage controller 200 ends the processing.

Alternatively, in a case where the result of the determination is that the received response is the Check Condition response (S2108: No), the storage controller 200 advances the processing to Step S2109 (refer to FIG. 22).

FIG. 22 is a second flowchart of the read process related to Example 4.

In Step S2109, the storage controller 200 determines whether or not refresh processing needs to be executed. Specifically, for example, the storage controller 200 determines whether or not refresh processing is necessary in accordance with whether or not the Check Condition response from the target FM controller 331 (Step S2105) is information to the effect that refresh processing is necessary (error information or the like).

In a case where the result of the determination is that refresh processing has been determined to be unnecessary (S2109: No), the storage controller 200 moves to Step S2110. In accordance with this, since it is conceivable that trouble of some sort has occurred in the target FMD 330, the storage controller 200 performs failure countermeasure processing using a known method and ends the processing.

Alternatively, in a case where the result of the determination is that refresh processing has been determined to be necessary (S2109: Yes), the storage controller 200 moves to Step S2111.

In Step S2111, the storage controller 200 determines whether or not the status is "Normal". Specifically, for example, the storage controller 200 references the status management table 63 and determines whether or not the status of the RAID group 320 comprising the target FMD 330 is "Normal". In a case where the result of the determination is that the status is "Normal" (S2111: Yes), the storage controller 200 moves to Step S2112. Alternatively, in a case where the result of the determination is that the status is not "Normal" (that is, "maintenance in progress" or the like) (S2111: No), the storage controller 200 ends the processing. This is because a status other than "Normal" signifies that an FMD 330 other than the target FMD 330 is executing internal processing, such as the RC process or the refresh process, or other failure countermeasure processing. In accordance with this, the number of FMDs 330 executing either the internal processing or the failure countermeasure processing in the RAID group 320 is maintained at one. Thus, the storage controller 200 can execute either the normal read process or the correction read process at any time, making it possible to prevent a read response delay.

In Step S2112, the storage controller 200 sends the target FM controller 331 the RC execution command specifying the target page. Then, in Step S2112, the storage controller 200 updates the flag 902 of the target FMD in the internal processing flag table 65 to "refresh in progress".

In Step S2115, the target FM controller 331 receives the refresh execution command. Then, in Step S2116, the target FM controller 331 executes the target page refresh process. Then, in Step S2117, the target FM controller 331 sends the storage controller 200 the Good response (a response including information to the effect that refresh processing has ended).

In Step S2114, the storage controller 200 receives the Good response from the target FM controller 331 and updates the flag 902 of the target FMD in the internal processing flag table 65 to "Normal".

According to the above-described processing, the storage controller 200 can discern the state of the FMD 330 in accordance with the storage controller 200 storing the status management table 63 and the internal processing flag table 65. Then, in accordance with the FM controller 331 conveying the state of the read-source page to the storage controller 200 after the read process has ended, the storage controller 200 can instruct the FMD 330 comprising the page for which refresh processing is necessary to execute refresh processing.

In the above-described example, the FMD 330 comprises an interface 39 for receiving the refresh execution command, and the storage controller 200 comprises an interface 38 for sending the refresh execution command. This makes it possible to execute refresh processing, which is one of the internal processes, in accordance with a read command from the storage controller 200.

In the above-described example, information constituting the basis of a determination as to the need to execute refresh processing (that is, the information, which is sent to the storage controller 200 from the FMD 330, and is used by the storage controller 200 in determining whether or not to execute refresh processing in the FMD 330) is included in a response (the response sent from the FMD 330 to the storage controller 200) to a command sent to the FMD 330 from the storage controller 200 for a purpose other than acquiring the information, which constitutes the basis of the determination as to the need for executing refresh processing. For this reason, it is not necessary to provide a command for requesting the acquisition of information for determining the need for the refresh. Also, the communication bandwidth between the storage controller 200 and the FMD 330 is not used solely for sending the information for determining the need for the refresh.

Specifically, in this example, the information, which constitutes the basis of the determination as to the need for executing refresh processing, is included in the read command response (the response to the read command). The FMD 330, in the processing performed in a case where a read command has been received, detects the state of the storage area comprising the read source (for example, the read-source page, the block comprising the read-source page, the FM chip comprising this block, and either two or more FM chips, which include this FM chip, or all the FM chips, which include these two or more FM chips), and sends the Check Condition response comprising information based on the detected state. Determining the state of the storage area at the time of a read with respect to this storage area is more efficient than going to the trouble of detecting the state of this storage area at another time when there is no read from this storage area.

In this example, a case in which refresh processing is performed was explained as internal processing, but processes other than the refresh process, such as the RC process, may be applied to this example as internal processing.

In the above explanation, the condition for executing refresh processing is that either the page error bits exceed a first threshold or the number of cumulative reads exceed a second threshold. However, another condition may be used as the refresh processing execution condition. The probability of an error bit occurring in data stored in a page included in a block having a large number of erases increases more than in a case where the number of erases is small. Consequently, the threshold may be lowered in accordance with an increase in the number of erases.

A number of examples have been explained hereinabove, but the present invention is not limited to the above-described examples, and can be applied to various other modes.

For example, the RAID level of the RAID group may be the level for which two or more parities are included in a single stripe (the I/O unit area, which spans all of the PDEVs comprising the RAID group).

The above-described examples are cases in which the FMD 330 performs internal processing in accordance with an I/O command from the storage controller 200. However, the FMD 330 may perform internal processing autonomously.

In the above-described examples, the correction read process may be performed instead of the normal read process. The correction read process in this case may be performed under a fixed condition. For example, a read disturb (a phenomenon via which a bit error occurs in the target page and/or an adjacent page when reading data from the target page) is apt to occur when the number of erases of a block becomes large, such as a block in which internal processing occurs a large number of times. That is, in a block having a large number of erases, refresh occurs relatively frequently. In a case where a block having a number of erases equal to or larger than a prescribed number exists in the read-source FMD, and, in addition, a block having a number of erases equal to or larger than a prescribed number does not exist in another FMD of the RAID group to which the read-source FMD belongs, the storage controller 200 may perform a correction read process, which restores the read data by reading data and parity from the other FMD only.

The configuration may be such that the FMD 330 includes only its own state in a response, and the storage controller 200 makes a determination as to whether or not internal processing is necessary in the FMD 330. For example, the FMD 330 may include only information on the number of free pages and the number of invalid pages of a block in which data has been written in the response, or may include only information on the number of its own free blocks in the response. In addition, for example, the FMD 330 may include only information on the number of error bits and the number of cumulative reads of a page from which data has been read in the response.

REFERENCE SIGNS LIST

10 Host computer
100 Storage system
200 Storage controller
300 Storage unit

The invention claimed is:

1. A storage system, which receives an I/O (Input/Output) request specifying a logical address of a logical storage area from a higher-level apparatus, comprising:
    a RAID (Redundant Arrays of Inexpensive Disks) group comprising multiple physical storage devices; and
    a storage controller, which, in accordance with the I/O request from the higher-level apparatus, configured to send an I/O command to a target physical storage device, which is an I/O-destination physical storage device in the RAID group,
    each physical storage device comprising:

a physical area, which is regarded as the basis of the logical storage area; and a device controller, which is coupled to the physical storage area, configured to execute internal processing, which is processing executed without receiving a command from outside of the physical storage device, wherein a physical storage area state changes in accordance with the input/output of data to/from the physical storage area, the device controller inside the target physical storage device is configured to:

(a) execute data I/O processing with respect to the physical storage area in accordance with the I/O command from the storage controller; and (b) subsequent to executing the I/O processing in the (a), send to the storage controller a response with respect to the I/O command, the response comprising status information, which is information denoting a state of the physical storage area subsequent to being changed in accordance with the I/O processing, the storage controller is configured to:

(A) receive the response from the target physical storage device; and (B) based on the status information included in the response received in the (A), make a determination as to whether or not to execute the internal processing, and in a case where the result of the determination is to execute the internal processing, send to the target physical storage device an internal processing execution command instructing to execute internal processing, and the device controller in the target physical storage device is configured to:

(c) upon receiving the internal processing execution command, execute internal processing in accordance with the internal processing execution command, wherein the status information is information as to whether or not the target physical storage device is in a state in which the internal processing is necessary, wherein the storage controller comprises a storage area, and the storage area stores management information comprising information denoting whether or not respective multiple physical storage devices are executing internal processing, and wherein (Y) the storage controller, in a case where a read request has been received from the higher-level apparatus, is configured to send a read command for reading read-target data to a read-source device when the management information denotes that the read-source device, which is the physical storage device constituting the destination of a read command conforming to the read request, is not executing internal processing, and, when the management information denotes that the read-source device is executing internal processing, perform a correction read in which read commands for reading data and parity are respectively sent to multiple other physical storage devices of the RAID group to which the read-source device belongs, and the read-target data is restored based on the data and parity read in accordance with these read commands.

2. The storage system according to claim 1, wherein:
the physical storage device is a flash memory drive,
the physical storage area comprises multiple blocks,
each of the multiple blocks comprises multiple pages, and data read and data write are performed in page units, and a data erase is performed in block units, and
wherein the device controller in the target physical storage device is configured to:

in the (a), execute a write process for writing data to the page as the I/O process; and in the (b), send to the storage controller a response comprising the status information with respect to a write-destination block, which is the block comprising a write-destination page of the write process, in a case where a percentage of a free page, in which data is not stored, relative to all pages is less than a first threshold, and, in addition, a percentage of invalid pages, which are pages in which data is stored but which is not allocated to the logical area, relative to all the pages is equal to or larger than a second threshold, in the write-destination block.

3. The storage system according to claim 2, wherein the internal processing is a reclamation process.

4. The storage system according to claim 1, wherein:
the physical storage device is a flash memory drive,
the physical storage area comprises multiple blocks,
each of the multiple blocks comprises multiple pages, and data read and data write are performed in page units, and a data erase is performed in block units, and
wherein the device controller in the target physical storage device is configured to:

in the (a), execute a write process for writing data to the page as the I/O process; and in the (b), send to the storage controller a response comprising the status information in a case where a percentage of a free block, which is a block comprising only a free page, which is a page in which data is not stored, relative to all blocks of the target physical storage device is less than a third threshold.

5. The storage system according to claim 4, wherein the internal processing is a reclamation process.

6. The storage system according to claim 1, wherein:
the physical storage device is a flash memory drive,
the physical storage area comprises multiple blocks,
each of the multiple blocks comprises multiple pages, and data read and data write are performed in page units, and a data erase is performed in block units, and
wherein the device controller in the target physical storage device is configured to:

in the (a), execute a read process for reading data from the page as the I/O process; and in the (b), send to the storage controller a response comprising the status information in a case where the data read-source page in the read process is a page for which either the number of error bits is larger than a fourth threshold, or the number of reads is larger than a fifth threshold.

7. The storage system according to claim 6, wherein the internal processing is a refresh process.

8. The storage system according to claim 1, wherein a disk controller of the read-source device, upon receiving the read command, is configured to send to the storage controller a response comprising information, which signifies that the internal processing is being executed when internal processing is being performed.

9. The storage system according to claim 1, wherein, in the (Y), the storage controller is configured to send the internal processing execution command to the target physical storage device when the management information denotes that the number of physical storage devices performing internal processing in the RAID group is equal to or less than a prescribed number, and not to send the internal processing execution command to the target physical storage device when the management information denotes that the number of physical storage devices performing internal processing in the RAID group exceeds the prescribed number.

10. A control method for a storage system, which has a RAID (Redundant Arrays of Inexpensive Disks) group comprising multiple physical storage devices, which comprise a physical storage area whose state changes in accordance with data being input and output, and which are capable of executing internal processing, which is processing executed without receiving a command from outside, and which receives an I/O (Input/Output) request specifying a logical address from a higher-level apparatus, the control method comprising:

sending an I/O command, which conforms to the I/O request from the higher-level apparatus, to a target physical storage device, which is the physical storage device of an I/O destination in the RAID group;

receiving from the target physical storage device, which has executed a data I/O process with respect to a physical storage area in accordance with the I/O command, the I/O command response comprising status information, which is information denoting the state of the physical storage area subsequent to having been changed in accordance with the I/O process;

making a determination as to whether or not the internal processing is to be executed based on the status information included in the received response, and, in a case where the result of the determination is that the internal processing is to be executed, sending to the target physical storage device an internal processing execution command instructing to execute the internal processing, wherein the status information is information as to whether or not the target physical storage device is in a state in which the internal processing is necessary;

storing management information comprising information denoting whether or not respective multiple physical storage devices are executing internal processing;

in a case where a read request has been received from the higher-level apparatus, sending a read command for reading read-target data to a read-source device when the management information denotes that the read-source device, which is the physical storage device constituting the destination of a read command conforming to the read request, is not executing internal processing; and when the management information denotes that the read-source device is executing internal processing, performing a correction read in which read commands for reading data and parity are respectively sent to multiple other physical storage devices of the RAID group to which the read-source device belongs, and the read-target data is restored based on the data and parity read in accordance with these read commands.

* * * * *